US012672166B2

(12) United States Patent
Oteri et al.

(10) Patent No.: US 12,672,166 B2
(45) Date of Patent: Jun. 30, 2026

(54) METHODS, APPARATUS, AND ANTENNA TECHNIQUES FOR NEW RADIO (NR) OPERATIONS IN UNLICENSED BANDS

(71) Applicant: InterDigital Patent Holdings, Inc., Wilmington, DE (US)

(72) Inventors: Oghenekome Oteri, San Diego, CA (US); Ahmad Reza Hedayat, Aliso Viejo, CA (US); Hanqing Lou, Syosset, NY (US); Rui Yang, Greenlawn, NY (US); Janet Stern-Berkowitz, Little Neck, NY (US); Moon Il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 681 days.

(21) Appl. No.: 17/842,697

(22) Filed: Jun. 16, 2022

(65) Prior Publication Data

US 2022/0330337 A1     Oct. 13, 2022

Related U.S. Application Data

(63) Continuation of application No. 16/967,887, filed as application No. PCT/US2019/017042 on Feb. 7, 2019, now Pat. No. 11,457,475.

(Continued)

(51) Int. Cl.
*H04W 74/08* (2024.01)
*H04L 5/00* (2006.01)
(Continued)

(52) U.S. Cl.
CPC ....... *H04W 74/0808* (2013.01); *H04L 5/0048* (2013.01); *H04W 16/14* (2013.01); *H04W 24/08* (2013.01); *H04W 72/23* (2023.01)

(58) Field of Classification Search
CPC . H04W 74/0808; H04W 16/14; H04W 24/08; H04W 72/23; H04W 72/0453;
(Continued)

(56) References Cited

U.S. PATENT DOCUMENTS 10,841,914 B2 * 11/2020 Liou ..................... H04L 5/0094
11,457,475 B2 * 9/2022 Oteri ..................... H04W 24/08
(Continued)

FOREIGN PATENT DOCUMENTS

CN          104584615 A     4/2015
CN          107005960 A     8/2017
WO     WO 2017196612 A1     11/2017

OTHER PUBLICATIONS

"3rd Generation Partnership Project; Technical Specification Group Radio Access Network; NR; Multiplexing and channel coding (Release 15)", 3GPP TS 38.212 V1.0.0, Sep. 2017, 13 pages.
(Continued)

*Primary Examiner* — John D Blanton
(74) *Attorney, Agent, or Firm* — Faster Greenberg, P.C.

(57)          ABSTRACT

An LBT method and apparatus are disclosed for a WTRU and gNB. A method may comprise receiving a gNB beam direction schedule and an LBT measurement configuration. The WTRU may switch a receiver so as to receive a beam based on the beam direction schedule and monitor for a DCI. The WTRU may be configured to determine whether there is a transmission for the WTRU and if there is, the transmission may be received. The transmission may be a DCI for an uplink transmission of the WTRU. A WTRU may be configured to receive the gNB beam direction schedule and the LBT measurement configuration at a start of an MCOT.

20 Claims, 20 Drawing Sheets

Related U.S. Application Data

(60) Provisional application No. 62/716,093, filed on Aug. 8, 2018, provisional application No. 62/630,643, filed on Feb. 14, 2018.

(51) Int. Cl.

| | |
|---|---|
| *H04W 16/14* | (2009.01) |
| *H04W 24/08* | (2009.01) |
| *H04W 72/23* | (2023.01) |
| *H04W 74/0808* | (2024.01) |

(58) Field of Classification Search
CPC .. H04W 72/232; H04W 72/50; H04L 5/0048; H04L 5/0053
See application file for complete search history.

(56) References Cited

U.S. PATENT DOCUMENTS

| | | | | |
|---|---|---|---|---|
| 2015/0245234 | A1 | 8/2015 | Roy et al. | |
| 2017/0118774 | A1* | 4/2017 | Cariou | H04W 74/0816 |
| 2017/0303136 | A1* | 10/2017 | Park | H04W 16/14 |
| 2017/0303220 | A1 | 10/2017 | Sadeghi et al. | |
| 2017/0331670 | A1 | 11/2017 | Parkvall et al. | |
| 2018/0227953 | A1* | 8/2018 | Kusashima | H04J 1/00 |
| 2018/0235008 | A1* | 8/2018 | Park | H04W 74/08 |
| 2018/0242348 | A1* | 8/2018 | Chendamarai Kannan | H04L 5/0053 |
| 2018/0368155 | A1* | 12/2018 | Xia | H04W 74/0808 |
| 2018/0376429 | A1* | 12/2018 | Islam | H04W 52/16 |
| 2019/0014598 | A1* | 1/2019 | Yoshimura | H04W 16/14 |
| 2019/0045457 | A1* | 2/2019 | Islam | H04W 52/50 |
| 2019/0141744 | A1* | 5/2019 | Naghshvar | H04B 7/0695 |
| 2019/0190668 | A1* | 6/2019 | Lei | H04W 74/0833 |
| 2019/0215140 | A1* | 7/2019 | Hafeez | H04W 72/541 |
| 2019/0246412 | A1* | 8/2019 | Noh | H04W 16/14 |
| 2019/0253976 | A1* | 8/2019 | Pelletier | H04W 52/146 |
| 2019/0373635 | A1* | 12/2019 | Yang | H04B 7/0695 |
| 2019/0380038 | A1 | 12/2019 | Bang et al. | |
| 2020/0077437 | A1* | 3/2020 | Stern-Berkowitz | H04W 72/044 |
| 2020/0170038 | A1 | 5/2020 | Park et al. | |
| 2020/0187253 | A1* | 6/2020 | Cui | H04W 74/0816 |
| 2020/0314906 | A1* | 10/2020 | Goyal | H04B 7/0696 |
| 2020/0336973 | A1* | 10/2020 | Niu | H04W 72/23 |
| 2020/0344819 | A1* | 10/2020 | Myung | H04W 74/0841 |
| 2020/0373988 | A1* | 11/2020 | Wang | H04L 5/0023 |
| 2020/0383110 | A1* | 12/2020 | Kusashima | H04L 5/0064 |
| 2021/0013954 | A1* | 1/2021 | Zhao | H04L 5/0048 |
| 2021/0058206 | A1* | 2/2021 | Ye | H04L 5/0048 |
| 2021/0058967 | A1* | 2/2021 | Oteri | H04W 72/23 |
| 2021/0076397 | A1* | 3/2021 | Xiong | H04L 27/2607 |
| 2021/0153162 | A1* | 5/2021 | Chen | H04W 56/001 |
| 2021/0337497 | A1* | 10/2021 | Siomina | H04J 11/0079 |
| 2021/0344397 | A1* | 11/2021 | Lee | H04L 5/0048 |
| 2022/0030527 | A1* | 1/2022 | Kim | H04W 52/42 |
| 2022/0330337 | A1* | 10/2022 | Oteri | H04W 74/0808 |
| 2024/0356619 | A1* | 10/2024 | Marinier | H04B 7/0695 |

OTHER PUBLICATIONS

LG Electronics, "Energy detection threshold in LAA", 3GPP Tdoc R1-155385, 3GPP TSG RAN WG1 meeting #82bis, Malmö, Sweden, Oct. 5-9, 2015, 4 pages.

"3rd Generation Partnership Project; Technical Specification Group Radio Access Network; NR; Physical channels and modulation (Release 15)", 3GPP TS 38.211 V15.0.0, Dec. 2017, 73 pages.

"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 285 pages.

Qualcomm, "New SID on NR-based Access to Unlicensed Spectrum", 3GPP Tdoc RP-170828, 3GPP TSG RAN Meeting #75, Dubrovnik, Croatia, Mar. 6-9, 2017, 5 pages.

"3rd Generation Partnership Project; Technical Specification Group Radio Access Network; NR; Physical channels and modulation (Release 15)", TS 38.211 V2.0.0, Dec. 2017, 73 pages.

Interdigital Inc., "Views on NR-Unlicensed Deployment Scenarios", 3GPP Tdoc R1-1802643, 3GPP TSG RAN WG1 Meeting #92, Athens, Greece, Feb. 26-Mar. 2, 2018, 3 pages.

Interdigital Inc., "Discussion on LBT in Unlicensed Higher Frequency Bands", 3GPP Tdoc R1-1802651, 3GPP TSG RAN WG1 Meeting #92, Athens, Greece, Feb. 26-Mar. 2, 2018, 4 pages.

"3rd Generation Partnership Project; Technical Specification Group Radio Access Network; Evolved Universal Terrestrial Radio Access (E-UTRA); Physical layer procedures (Release 14)", 3GPP TS 36.213 V14.4.0, Sep. 2017, 49 pages.

Interdigital Inc., "On Downlink Signals and Channels for NR-U", 3GPP Tdoc R1-1809087, 3GPP TSG RAN WG1 Meeting #94, Gothenburg, Sweden, Aug. 20-24, 2018, 3 pages.

Ad Hoc Chair (Nokia), "Chairman's notes of AI 7.4 Channel Coding", 3GPP Tdoc R1-1719254, 3GPP TSG RAN WG1 Meeting #90bis, Prague, Czechia, Oct. 9-13, 2017, 7 pages.

"Part 11: Wireless LAN Medium Access Control (MAC) and Physical Layer (PHY) Specifications", IEEE Standards Association; 802.Nov. 2012, Mar. 29, 2012, 2793 pages.

Interdigital Inc., "On LBT for Beam-Based Transmission for NR-U", 3GPP Tdoc R1-1804885, 3GPP TSG RAN WG1 Meeting #92bis, Sanya, China, Apr. 16-20, 2018, 6 pages.

3GPP TSG RAN WG1 Meeting #90, R1-1713785, Huawei, HiSilcon; "Coexistence and channel access for NR unlicensed band operation," Prague, Czech Republic, Aug. 21-25, 2017, 5 pages.

* cited by examiner

Receive Beam (G1 dBi)

Transmit Beam (G2 dBi)

Gain Compensation = G2-G1

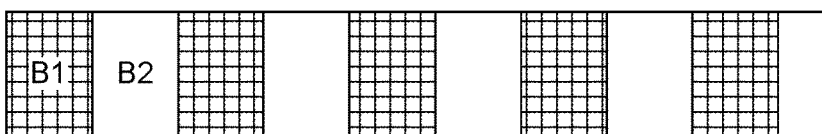

FIG. 5

WTRU Receives Configuration to Enable Multiple Independent LBT Processes for each Transmit Beam. This may Include the LBT Receive Beam ⌐ 610

WTRU Identifies Receive Beam for LBT Process ⌐ 620

WTRU Estimates Gains for Receive and Transmit Beams ⌐ 630

WTRU Measures Power for LBT Based on LBT Configuration ⌐ 640

For LBT CCA Measurement, WTRU Adjusts the CCA Threshold for 0 dB Gain Compensation and for the Difference in Gain between Receive and Transmit Beams ⌐ 650

WTRU Determines if the Medium is free Based on Power Measurement and Threshold ⌐ 660

CCA Success     CCA Failure

WTRU Transmits Its Data ⌐ 670

WTRU Defers Its Transmission ⌐ 680

FIG. 6

Measurement Times for LBT Process 1 with Beam 1

Measurement Times for LBT Process 2 with Beam 2

Measurement Times for LBT Process 1 with Beam 1

Measurement Times for LBT Process 2 with Beam 2

Threshold = 2

Power Over All Time = (2 + 2)/4 = 1 : CCA Clear

Power Over s0 and s2 = (2+2)/2 = 2 : CCA Busy

Power Over s1 and s3 = (0+0)/2 = 0 : CCA Clear

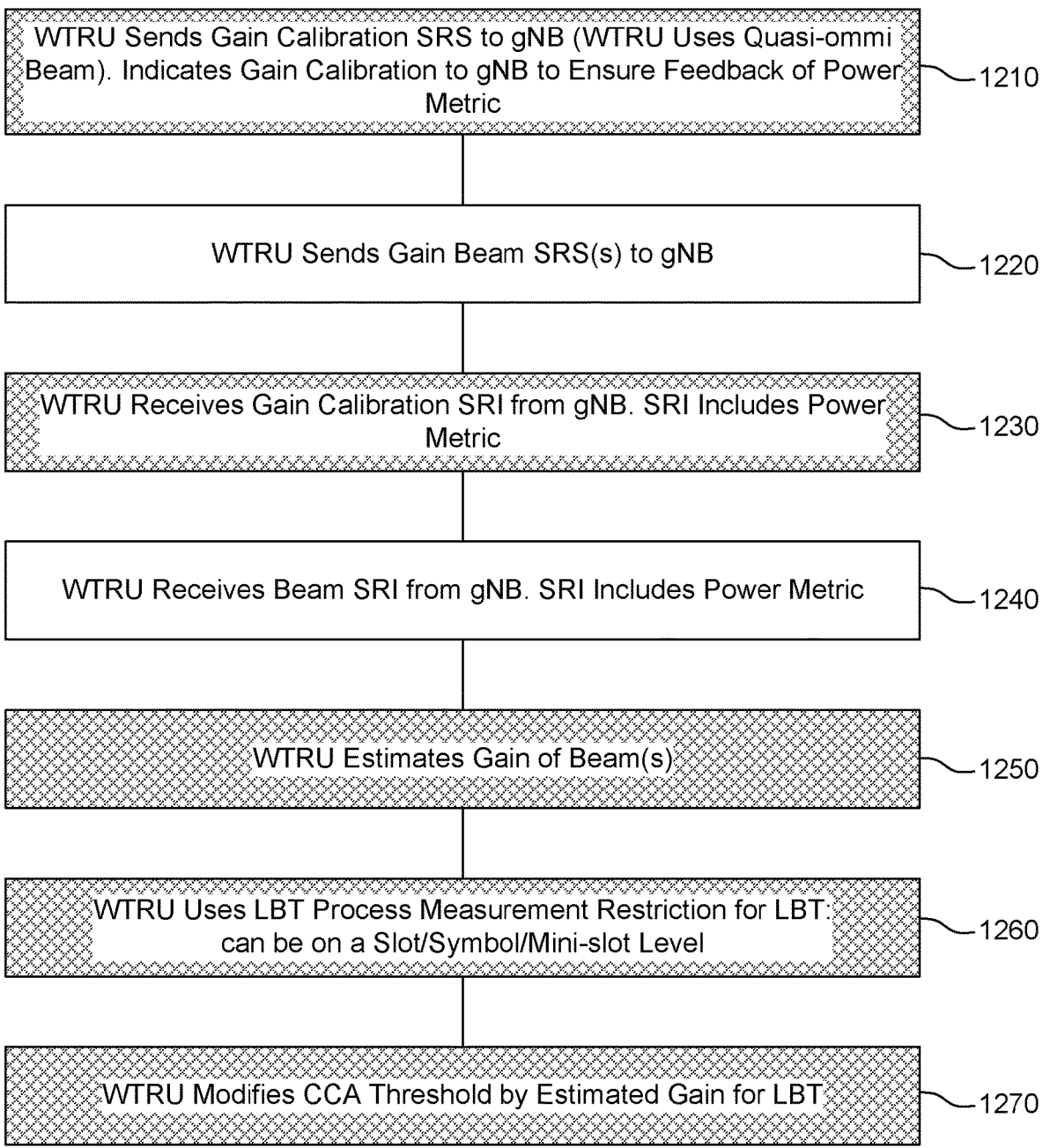

WTRU Sends Gain Calibration SRS to gNB (WTRU Uses Quasi-ommi Beam). Indicates Gain Calibration to gNB to Ensure Feedback of Power Metric — 1210

WTRU Sends Gain Beam SRS(s) to gNB — 1220

WTRU Receives Gain Calibration SRI from gNB. SRI Includes Power Metric — 1230

WTRU Receives Beam SRI from gNB. SRI Includes Power Metric — 1240

WTRU Estimates Gain of Beam(s) — 1250

WTRU Uses LBT Process Measurement Restriction for LBT can be on a Slot/Symbol/Mini-slot Level — 1260

WTRU Modifies CCA Threshold by Estimated Gain for LBT — 1270

FIG. 12

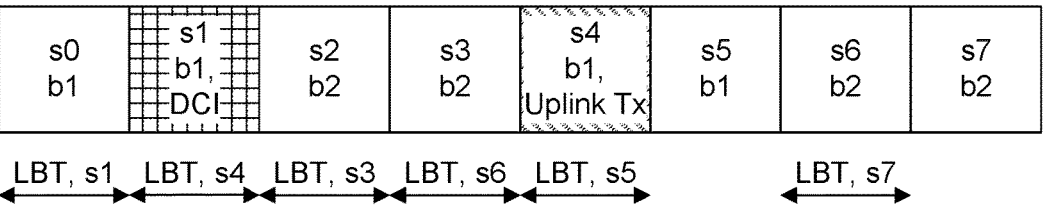
Continuous LBT : Example 1
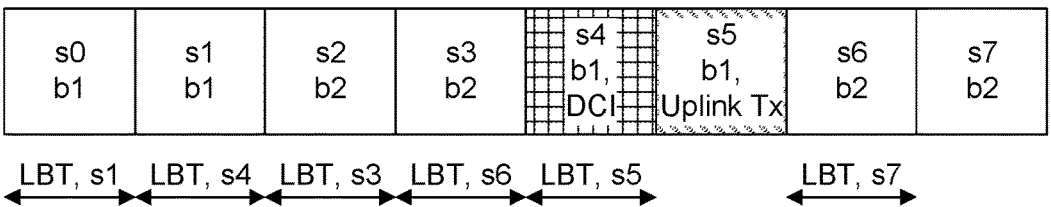
Continuous LBT : Example 2
FIG. 13
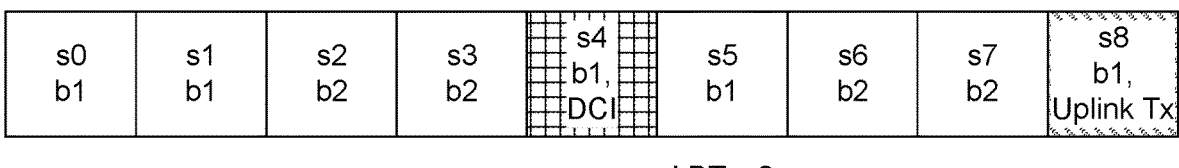
Instantaneous LBT (DCI Triggered) : Example 1
Instantaneous LBT (DCI Triggered) : Example 2
FIG. 14

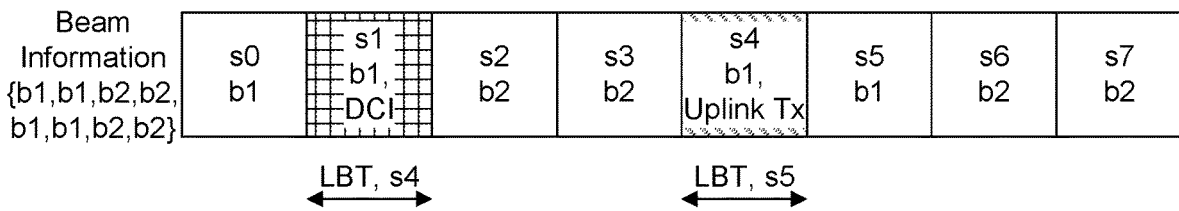
Beam Information Based LBT (e.g. in SFI) : Example 1
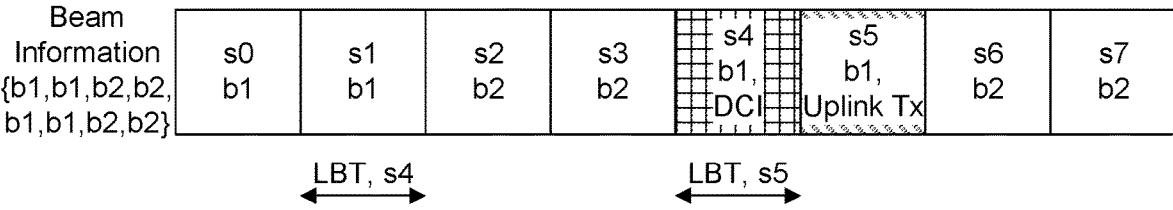
Beam Information Based LBT (e.g. in SFI) : Example 2
FIG. 15
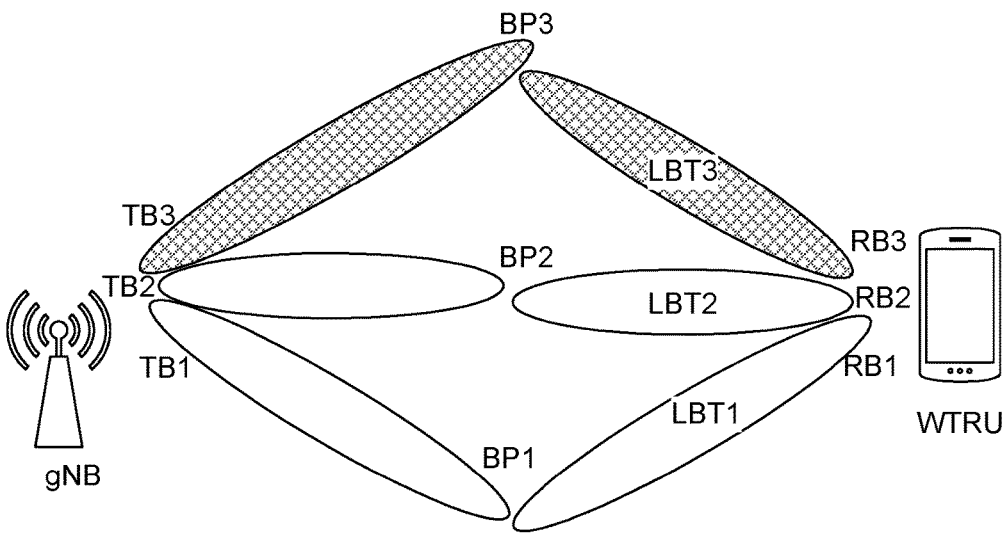
FIG. 16

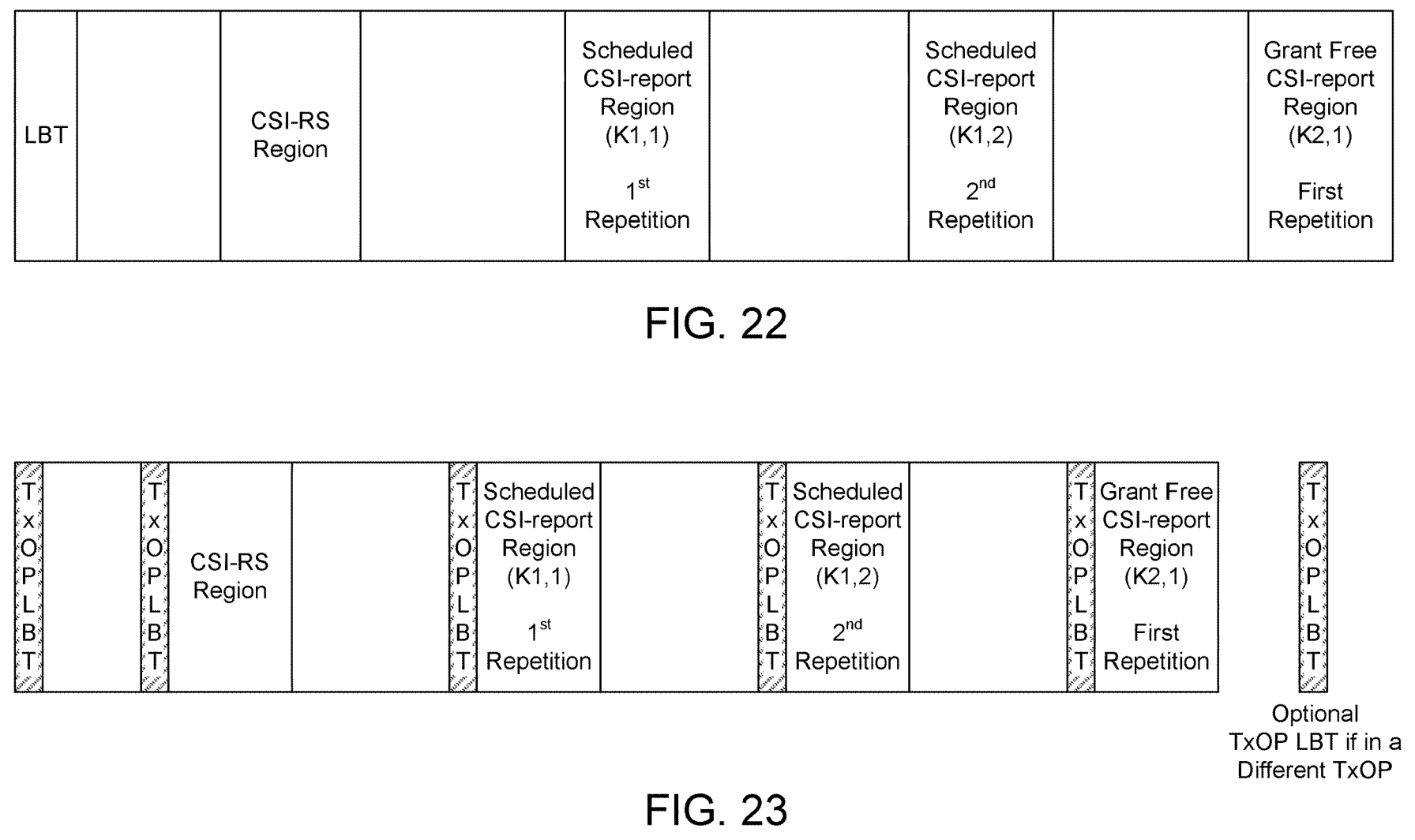

| LBT | CSI-RS Region | Scheduled CSI-report Region (K1,1) 1ˢᵗ Repetition | Scheduled CSI-report Region (K1,2) 2ⁿᵈ Repetition | Grant Free CSI-report Region (K2,1) First Repetition |
|---|---|---|---|---|

FIG. 22

| TxOP LBT | CSI-RS Region | TxOP LBT | Scheduled CSI-report Region (K1,1) 1ˢᵗ Repetition | TxOP LBT | Scheduled CSI-report Region (K1,2) 2ⁿᵈ Repetition | TxOP LBT | Grant Free CSI-report Region (K2,1) First Repetition | TxOP LBT |
|---|---|---|---|---|---|---|---|---|

Optional TxOP LBT if in a Different TxOP

FIG. 23

GAIN — 2502

ENERGY — 2504

CCA THRESHOLD — 2506

FREE? — 2508

TRANSMIT — 2510

METHODS, APPARATUS, AND ANTENNA TECHNIQUES FOR NEW RADIO (NR) OPERATIONS IN UNLICENSED BANDS

CROSS-REFERENCE TO RELATED APPLICATIONS

This application is a continuation of U.S. Ser. No. 16/967, 887, filed Aug. 6, 2020, which is a U.S. National Stage Application under 35 U.S.C. § 371 of International Patent Application No. PCT/US2019/017042, filed Feb. 7, 2019, which is incorporated herein by reference in its entirety. This application claims the benefit of U.S. Provisional Application Ser. No. 62/630,643 filed Feb. 14, 2018, and U.S. Provisional Application Ser. No. 62/716,093 filed Aug. 8, 2018, which are incorporated herein by reference.

RELATED ART

Cellular based access in unlicensed spectrum was introduced for operators to be able to complement their licensed service offerings with Licensed Assisted Access (LAA) and enhanced Licensed Assisted Access (eLAA). These technologies have extended LTE (Long Term Evolution) operations into unlicensed bands while using the licensed bands to assist in the unlicensed transmission, e.g., the transmission of control channel information.

SUMMARY

A listen before talk (LBT) method and apparatus are disclosed for a wireless transmit/receive unit (WTRU) and next generation Node B (gNB). A method may comprise receiving a gNB beam direction schedule and an LBT measurement configuration. The WTRU may switch a receiver so as to receive a beam based on the beam direction schedule and monitor for downlink control information (DCI). The WTRU may be configured to determine whether there is a transmission for the WTRU and, if there is, the transmission may be received. The transmission may be or may include DCI for an uplink transmission of the WTRU. A WTRU may be configured to receive the gNB beam direction schedule and the listen before talk (LBT) measurement configuration at a start of a maximum channel occupancy time (MCOT).

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 5 is a diagram illustrating an example of non-stationary energy in a channel due to rapid beam switching;

FIG. 6 is a flowchart illustrating a representative directional LBT procedure for beam based transmission;

FIG. 12 is a flowchart of a representative gain discovery for a transmit beam;

FIG. 13 is an illustration of a representative continuous LBT measurement with beam switching;

FIG. 14 is a diagram illustrating a representative instantaneous LBT with beam switching;

FIG. 15 is a diagram illustrating a representative beam information aided LBT;

FIG. 16 is a diagram illustrating a representative multi-beam transmission to/from a single transmission/reception point (TRP);

FIG. 22 is an example of a representative maximum channel occupancy time (MCOT) with scheduled repetitions K1=2 and grant free repetitions K2=1;

FIG. 23 is a diagram illustrating a representative MOT with LBT before repetition regions (e.g., each repetition region);

DETAILED DESCRIPTION

Figure 1A:
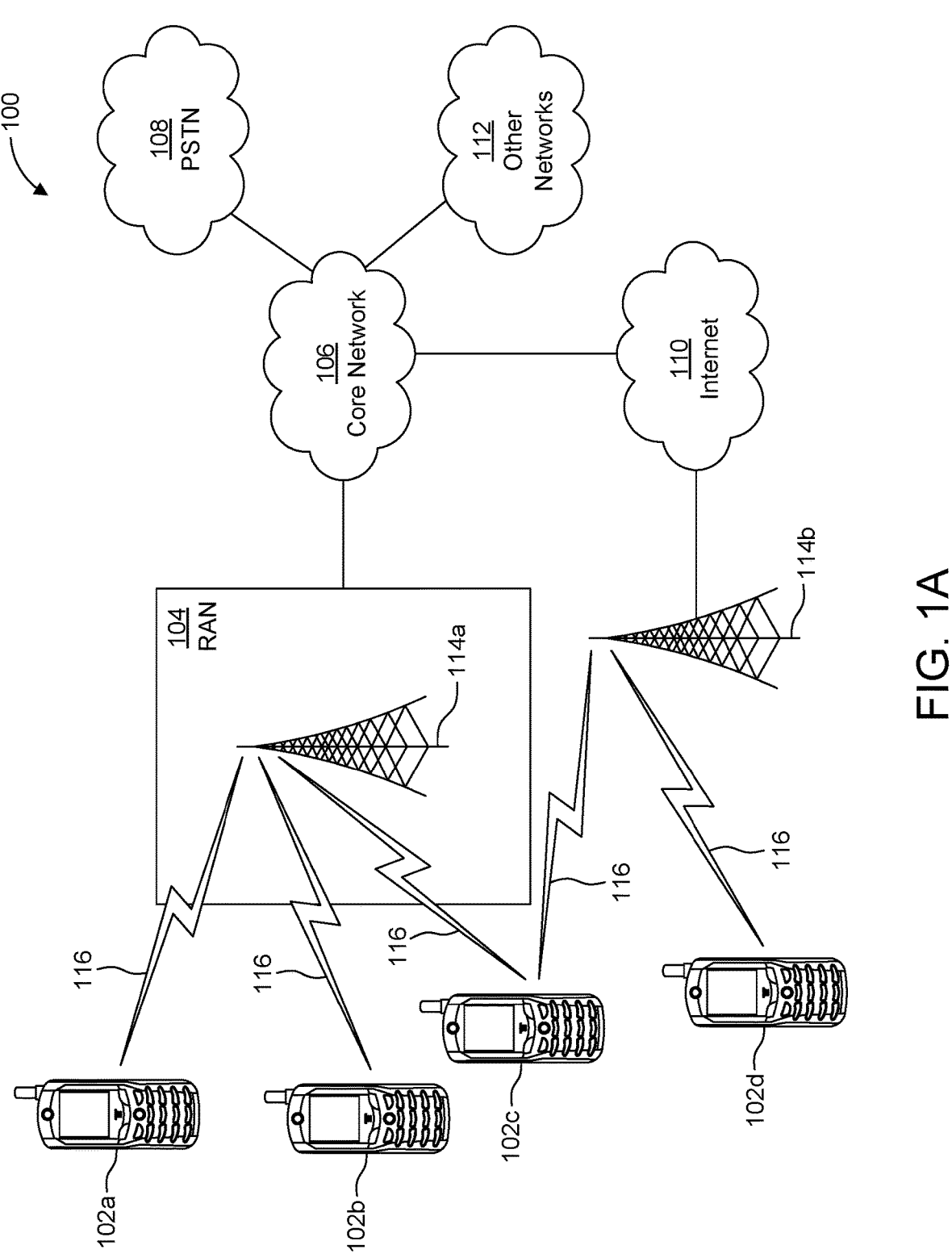
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
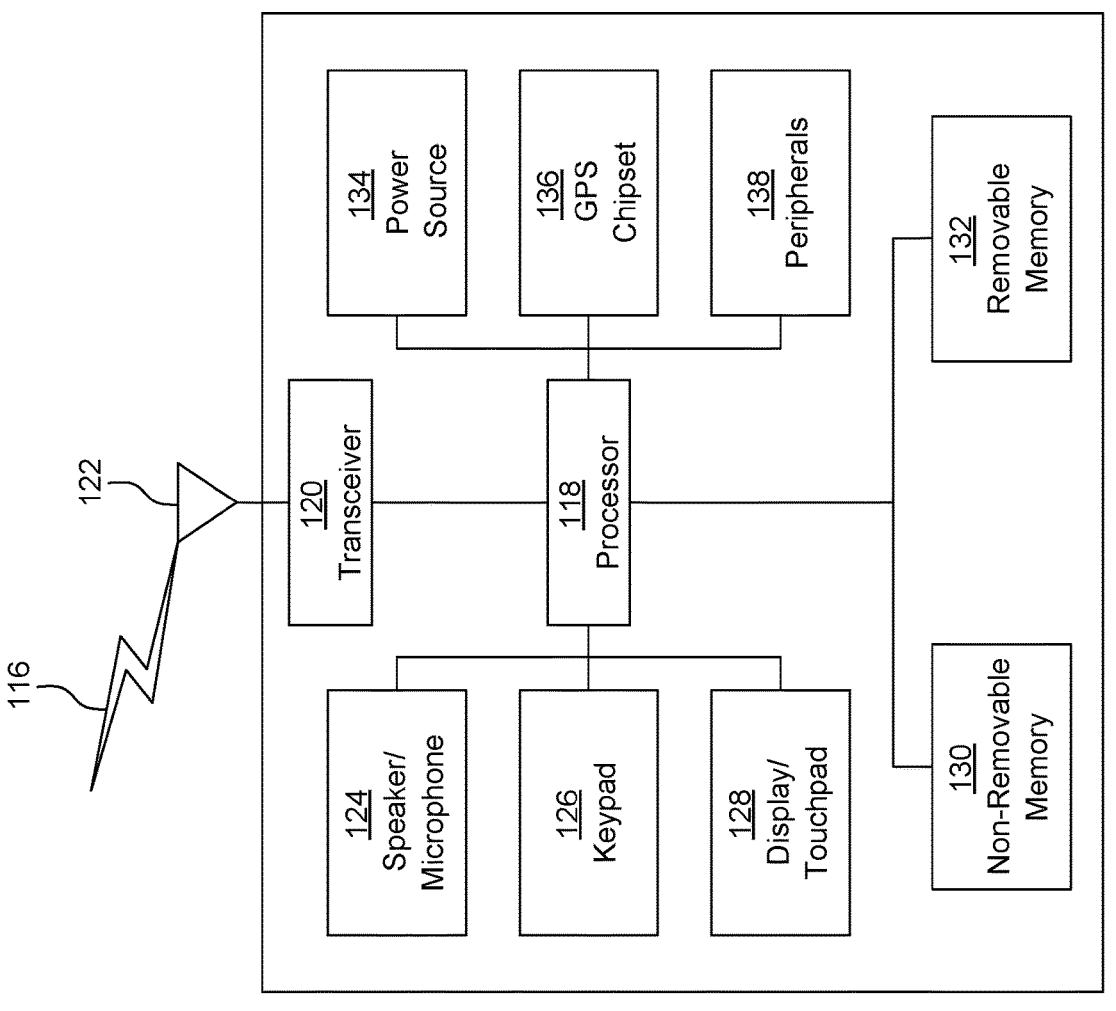
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116. The antennas of the gNB 180a or any transmitter may be or may include an array of antennas. In certain embodiments, signals provided to the antennas may be phase shifted with varying amplitudes to generate transmit beams (e.g., one or more main lobes each oriented such that the energy is in a direction). A transmit beam may have a beam width, a beam direction and a beam gain, among others.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
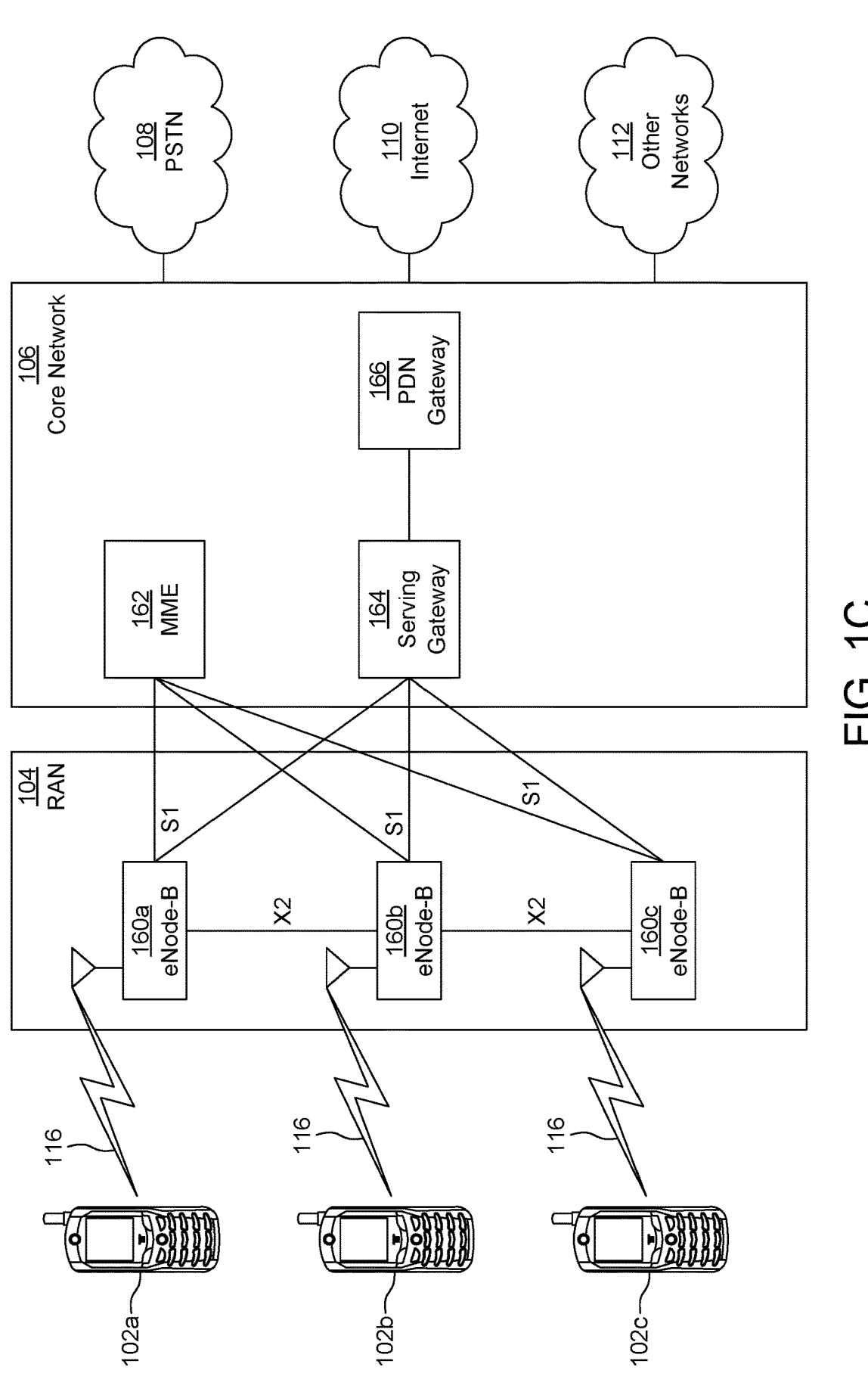
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.1 lac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11 ah, are from 902 MHz to 928 MHz In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country.

Figure 1D:
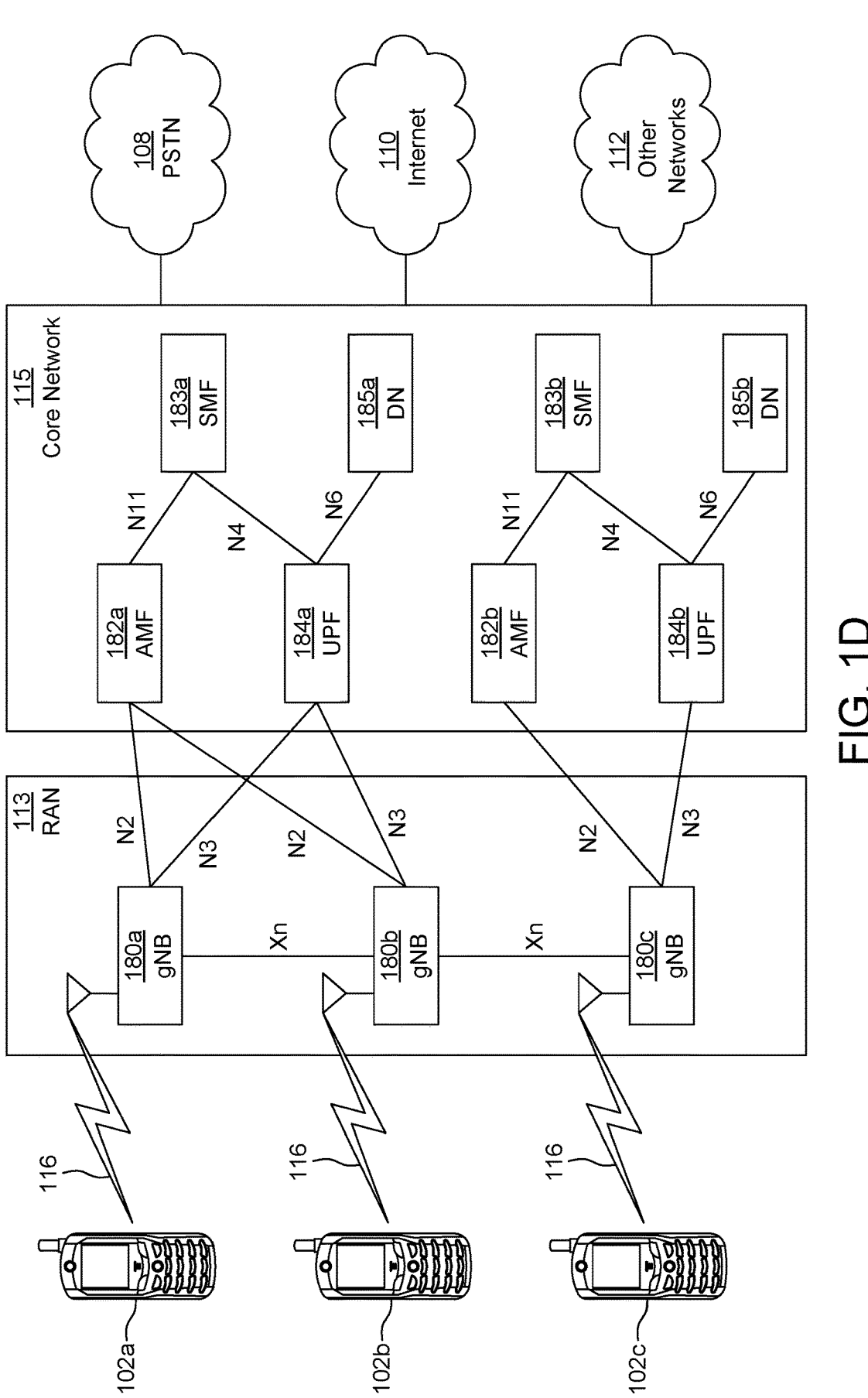
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. The antennas of the gNB 180a or any transmitter may be or may include an array of antennas. In certain embodiments, signals provided to the antennas may be phase shifted with varying amplitudes to generate transmit beams (e.g., one or more main lobes each oriented such that the energy is in a direction). A transmit beam may have a beam width, a beam direction and a beam gain, among others. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Cellular based access in unlicensed spectrum was introduced for operators to be able to complement their licensed service offerings with Licensed Assisted Access (LAA) and enhanced Licensed Assisted Access (eLAA). These technologies have extended LTE operations into unlicensed bands while using the licensed bands to assist in the unlicensed transmission, e.g., the transmission of control channel information. LAA supports only downlink transmission while eLAA adds support for uplink transmission.

In certain representative embodiments, an extension of NR-based Access to the Unlicensed Spectrum may be implemented for example in any of: sub 6 GHz unlicensed bands and above 6 GHz unlicensed bands (e.g., Sub 1 GHz, 1-6 GHz and/or above 6 GHz including various band/subbands such as 5 GHz, 37 GHz, 60 GHz). In certain representative embodiments, NR licensed assisted access (NR-LAA) may be supported, for example using an NR licensed carrier and/or an LTE licensed carrier. In certain representative embodiments stand-alone access and co-exist with both legacy 3GPP technologies (e.g., LAA, eLAA) and other RATs (e.g. 802.11ac and 802.11ax in the sub 6 band or 802.11 ad and 802.11ay in the above 6 band) may be implemented. It is contemplated that NR unlicensed access may support deployment scenarios such as indoor hotspots, dense urban scenarios, rural scenarios, urban macro scenarios, and/or high speed scenarios, or the like and use cases including enhanced mobile broadband (eMBB), massive machine type communications (mMTC) and ultra reliable and low latency communications (URLLC) defined for NR.

Licensed assisted access (LAA) operates on the 5 GHz unlicensed spectrum. To enable co-existence with LAA deployments and other RATs, LAA uses the listen before talk (LBT) protocol. For example, a transmitting entity, prior to a transmission, may perform a clear channel assessment (CCA) based on an energy detection (ED) over a time duration and may compare measured energy with an energy threshold to determine if the channel is occupied or clear. On gaining access to the channel, the transmitting entity may occupy the channel for a maximum duration called a maximum channel occupancy time (MCOT). There are four categories of LBT defined: Category 1: No LBT; Category 2: LBT without random back-off; Category 3: LBT with a random back-off with a contention window of a fixed size; and Category 4: LBT with random back-off with a contention window of a variable size.

In Category 1: No LBT, no LBT procedure is performed by the transmitting entity.

In Category 2: LBT without random back-off is performed such that a duration of time, during which the channel is sensed to be idle before the transmitting entity transmits, is deterministic.

In Category 3: LBT with random back-off is performed with a contention window of a fixed size such that the LBT procedure may have the following procedure as one of its components. The transmitting entity may draw a random number N within a contention window. The size of the contention window may be specified by the minimum and maximum value of N. The size of the contention window is fixed. The random number N may be used in the LBT procedure to determine the duration of time during which the channel is sensed to be idle before the transmitting entity transmits on the channel.

In Category 4: LBT with random back-off is performed with a contention window of a variable size such that the LBT procedure may have the following as one of its components. The transmitting entity may draw a random number N within a contention window. The size of the contention window may be specified by the minimum and maximum value of N. The transmitting entity may vary the size of the contention window when drawing the random number N. The random number N may be used in the LBT procedure to determine the duration of time during which the channel is sensed to be idle before the transmitting entity transmits on the channel.

In the case that a device may perform random back-off, different channel access priority classes and corresponding parameters are defined in Table 1. A priority class index is represented by p. A defer duration $T_d$ consists of a duration $T_f=16$ μs immediately followed by $m_p$ consecutive slot durations where each slot duration is $T_{sl}=9$ μs. $CW_{min,p}$ and $CW_{max,p}$ define the minimum and maximum size of the contention window. An eNode B may not continuously transmit on a carrier on which the LAA Scell(s) transmission(s) are performed, for a period exceeding the MCOT $(T_{mcot,p})$.

TABLE 1

| Channel Access Priority Class | | | | | |
| --- | --- | --- | --- | --- | --- |
| Channel Access Priority Class (P) | $m_p$ | $CW_{min,p}$ | $CW_{max,p}$ | $T_{mcot,p}$ | allowed $cw_p$ sizes |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Table 2 provides the LBT requirements for frame based equipment in Europe. LBT requirements for both frame based equipment (FBE) and load based equipment (LBE) may require and/or may use a minimum CCA time of 20 μs in the 5 GHz band and a MCOT of 10 msec and an idle period of minimum 5% of the channel occupancy time. Assuming that the receive antenna gain G=0 dBi, if the Effective Isotropic Radiated Power EIRP=23 dBm at the transmitter, then the CCA energy detection threshold≤−73 dBm/MHz, otherwise for different transmit power levels, PH, this threshold=−73 (dBm/MHz)+23 (dBm)−PH (dBm).

TABLE 2

LBT requirements for Frame-Based-Equipment in Europe

| Parameter | Requirement | Comment |
|---|---|---|
| Clear Channel Assessment (CCA) time | Minimum 20 µs | |
| Channel Occupancy time | Minimum 1 ms, maximum 10 ms | |
| Idle period | Minimum 5% of channel occupancy time | |
| Fixed frame period | Equals to Channel Occupancy time + Idle Period | |
| Short control signaling transmission time | Maximum duty cycle of 5% within an observation period of 50 ms | Part of Channel occupancy time |
| CCA Energy detection threshold | Assuming receive antenna gain G = 0 dBi: If EIRP = 23 dBm at transmitter Threshold ≤ −73 dBm/MHz Otherwise (different transmit power levels, PH) Threshold = −73(dBm/MHz) + 23(dBm) − PH(dBm) | For WAS/RLAN |

As the frequency band/frequency increases in frequency (e.g. at millimeter wave frequencies), NR transmission may become more beam based and the transmissions may become more directional. Existing LBT mechanisms, operations and/or procedures may use omni-directional transmission and may be unable to evaluate the medium properly, as illustrated in FIG. 2.

Figure 2:
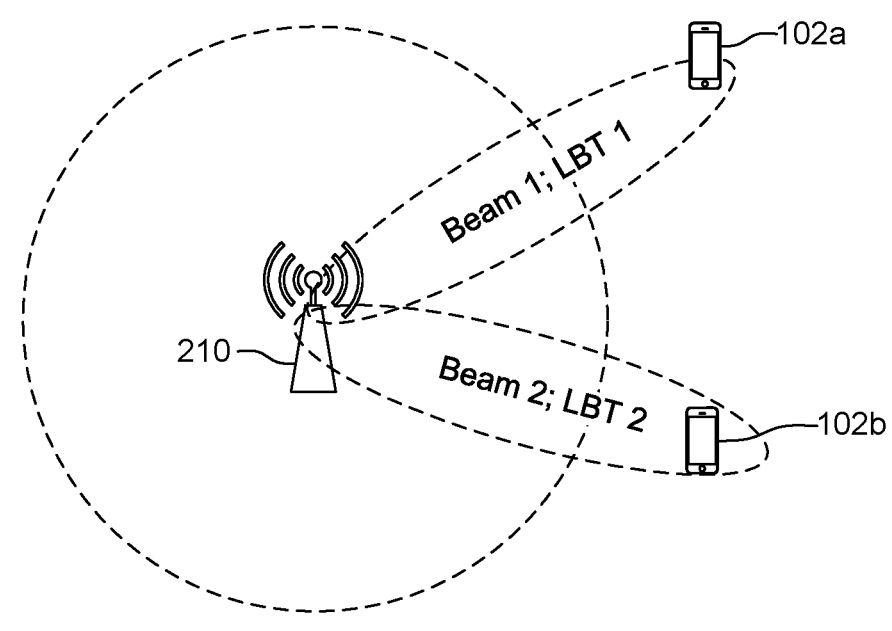
FIG. 2 is a diagram illustrating a representative Listen Before Talk (LBT) procedure.
Figure 3:
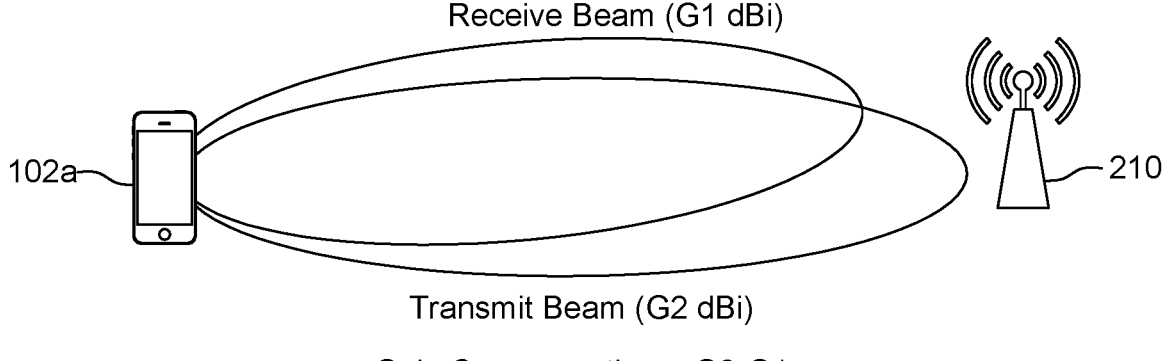
FIG. 3 is a diagram illustrating a representative gain discovery for a transmit beam and/or a receive beam.

FIG. 2 is a diagram illustrating a representative Listen Before Talk (LBT) procedure. FIG. 3 is a diagram illustrating a representative gain discovery for a transmit beam and/or a receive beam.

In FIG. 2, a gNB 210 may be connected to a first WTRU 102a and a second WTRU 102b. When the gNB 210 performs an omnidirectional LBT, as represented by the circle, it may be unable to evaluate the medium. The gNB 210 may implement directional LBTs (e.g., using Beam 1 for LBT1 with WTRU 102a and using Beam 2 for LBT2 with WTRU 102b), for example to correctly sense the channel.

In an LBT operation, a beam correspondence or reciprocity is assumed. For example, the listen (e.g., for a beam reception beamforming direction and gain) may be assumed to be the same as the talk (e.g., for a beam transmission). In a directional LBT the transmit and receive beams may or may not have the same gain, as illustrated in FIG. 3 for which the receive beam is different from the transmit beam and the gain G1 associated with the receive beam is different from the gain G2 associated with the transmit beam. In certain representative embodiments, a procedure, operation or apparatus may be implemented to compensate for a difference between transmit and receive gains.

Figure 4:
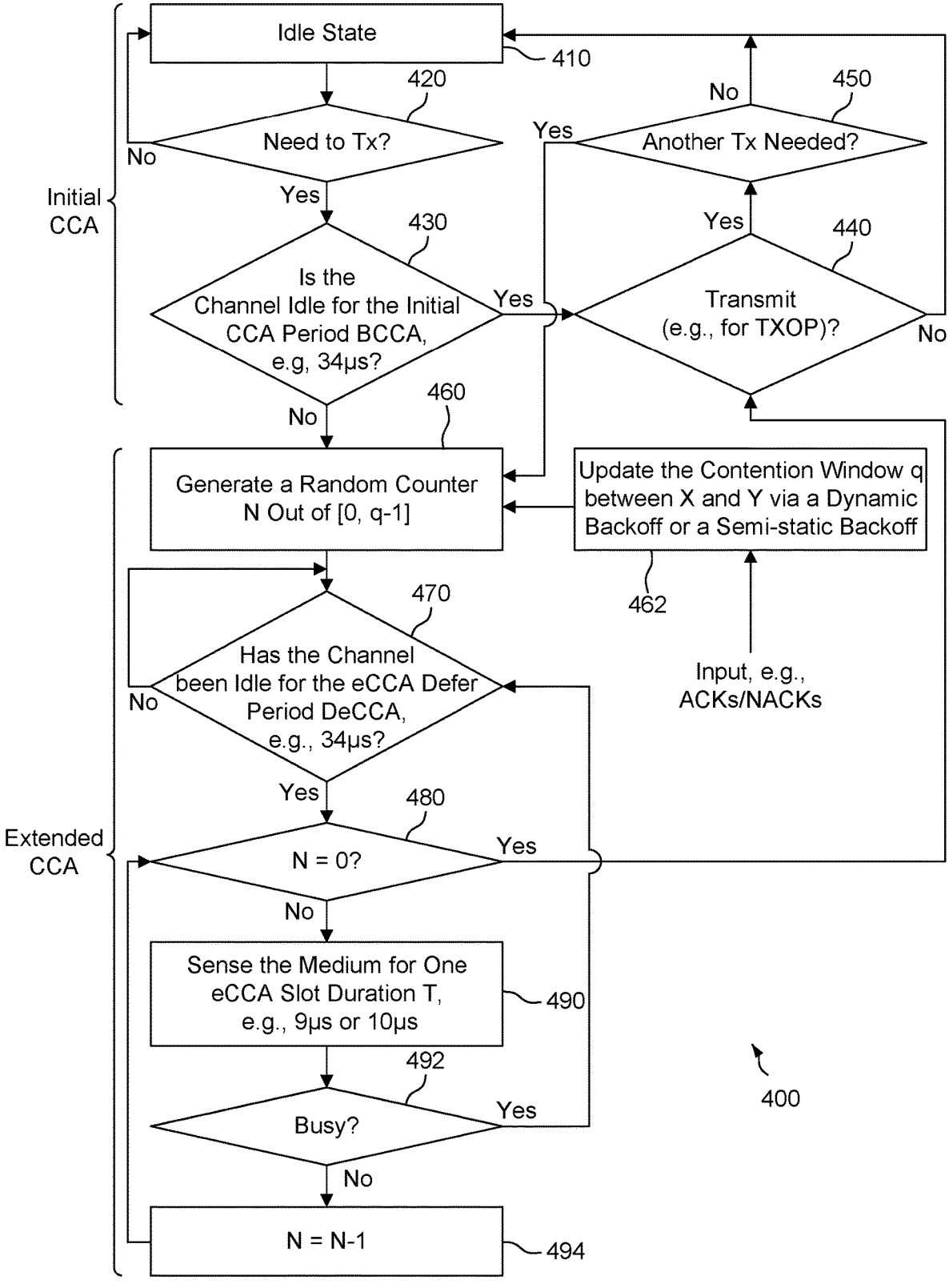
FIG. 4 is a flowchart illustrating a representative downlink licensed assisted access (LAA) secondary cell (SCell) Category 4 listen before talk (LBT) procedure.

FIG. 4 is a flowchart illustrating a representative downlink licensed assisted access (LAA) secondary cell (SCell) Category 4 listen before talk (LBT) procedure.

Referring to FIG. 4, the flowchart 400 may include an initial CCA procedure and/or an extended CCA procedure. The extended CCA procedure, in which back-off is performed, is performed after an initial CCA procedure that may last at least 20 µs. The CCA procedure may be performed by a transmitting entity, which may be a WTRU or a gNB.

While the transmitting entity is in an idle state 410 (e.g., a WTRU, a gNB and/or other transmission device for example in the idle state and/or not transmitting), the transmitting entity may check at 420 if data is to be transmitted. In case the response is no, the transmitting entity may return to the idle state 410. Otherwise, the transmitting entity may check at 430 if a channel is idle for an initial CCA period BCCA, e.g., 34 µs. If the response is yes, the transmitting entity may check at 440 if it is to transmit (e.g., for Transmit Opportunity TXOP). If the response is no, the transmitting entity may return to the idle state 410. Otherwise, the transmitting entity may check at 450 if another transmission is needed. If the response is no, the transmitting entity may return to the idle state 410. Otherwise, the process continues to 460.

If the channel is not idle for the initial CCA period at 430, an extended CCA procedure may be performed starting at 460 by generating a random counter N out of [0, q−1], where q is a contention window updated at 462 between X and Y in response to an input, e.g. ACKS/NACKs (Acknowledgements/Negative Acknowledgements), via a dynamic backoff or a semi-static backoff. The transmitting entity may check at 470 if the channel has been idle for the eCCA defer period DeCCA, e.g., 34 µs. If the response is no, the checking process 470 may be repeated until the response is yes. If the response is yes, at 480, N may be checked. If N=0, then the process goes to 440.

If N≠0, the transmitting entity may sense the medium for one eCCA slot duration T, e.g., 9 µs or 10 µs. At 492, the transmitting entity may check if the medium is busy. If the response is yes, the process may return to 470. Otherwise, at 494, N may be decremented to N−1 and the process may return to 480.

Although the responses to various blocks of FIG. 4 are shown as either "yes" or "no", other affirmative or negative indications/flags (e.g., a 1-bit indicator) are possible including a first logic level "1" or second logic level "0" for such an indication.

3GPP Release 13 defines LAA only for the downlink (DL), i.e. the LBT process may be performed only by the gNB. One of the main features of 3GPP Release 14 is the introduction of enhanced-Licensed Assisted Access (eLAA), which includes uplink (UL) operation for LAA. The technology continued to be developed in 3GPP's release 15 under the title Further Enhanced LAA (feLAA).

In LAA, a Discovery Reference Signal (DRS), may consist of and/or may include synchronization signals and reference signals for cell detection, synchronization and/or radio resource management. The DRS may include one or more CSI-Reference Signals (CSI-RSs) (e.g., if the CSI-RSs are configured). LAA DRS may be transmitted within a time window (e.g., periodically occurring time window) called the DRS Measurement Timing Configuration (DMTC) that has a fixed duration of 6 ms, a configurable period of 40, 80 or 160 ms and/or is subject to an LBT. The network may attempt DRS transmission in any subframe within the DMTC occasion.

It is contemplated that certain embodiments may be implemented using different numerologies for example, for sub 6 and above 6 unlicensed bands (e.g., 5 GHz, 37 GHz, 60 GHz). It is also contemplated that certain embodiments may be implemented in which NR-LAA is anchored to a legacy LTE carrier by dual-connectivity (DC), as well as CA (Carrier Aggregation) based aggregation with a 5G NR anchor. It is further contemplated that certain embodiments may be implemented using a standalone NR operation in unlicensed spectrum.

As beams become more directional, it is contemplated that directional LBT mechanisms for beam-based transmission/reception may take into consideration the deteriorated hidden node and exposed node problems in the directional transmission.

NR allows for the switching of beams on a symbol or mini-slot granularity. One possible transmission scenario may be that the gNB switches beams within an MCOT. Table 3 shows the numerology and associated symbol duration for NR.

TABLE 3

| | | Numerology for 3GPP NR | | | |
|---|---|---|---|---|---|
| μ | Delta f | N_slot/ symbols | N_subframe/ slot | usec/ subframe | symbol (usec) |
| 0 | 15 | 14 | 1 | 1000 | 71.43 |
| 1 | 30 | 14 | 2 | 500 | 35.71 |
| 2 | 60 | 14 | 4 | 250 | 17.86 |
| 3 | 120 | 14 | 8 | 125 | 8.93 |
| 4 | 240 | 14 | 16 | 62.5 | 4.46 |
| 5 | | 14 | 32 | 31.25 | 2.23 |

If a beam is switched on a symbol granularity, e.g., as supported in licensed NR, the energy in the channel may become non-stationary.

FIG. 5 is a diagram illustrating an example of non-stationary energy in a channel due to rapid beam switching between two beams B1 and B2.

Referring to FIG. 5, for rapid switching, for certain numerologies (e.g., as small as 4.46 or 2.23 μs) the non-stationary energy may be problematic for the device measuring the CCA. The problem may be that a device/WTRU measuring the energy in the channel over a period of time to estimate the power, may erroneously estimate the energy as a portion (e.g., half) what it should be and may erroneously conclude/determine that the channel is or may be available, for example, if the ED (Energy Detection) threshold is 2 dBm estimated with 90% probability over a 4 μs interval (as in 802.11) and two beams B1 and B2 are received with an energy of 2 dBm during a measurement.

As another example, if the numerology used is 2.23 μs and the WTRU is measuring the energy over 4 μs, the WTRU may erroneously conclude/determine that the measured energy is −1 dBm (divided by 2 or modified by 3 dB). Certain representative embodiments to reduce the probability of this occurring are disclosed herein. In various representative embodiments, procedures, operations and/or apparatus may be implemented to perform directional LBT on a new beam before the new beam is switched. Methods, procedures and/or operations to enable the timing and/or duration of LBT per beam before switching are also disclosed herein.

LBT implies a listen/receive procedure on a receive beam and a talk/transmit procedure on a transmit beam. Ideally, for the LBT procedure to be effective, the receive and transmit beams have identical boresights and beam widths (e.g., point in the same direction) and have identical gains. This may be achieved if the beams are reciprocal and/or have beam correspondence.

In the case that there is no beam correspondence or non-reciprocal beams, as illustrated in FIG. 3, a modification of the LBT procedure may be used to account for the differences in the transmit and receive beams. A procedure may be used to identify the best receive beam corresponding to a transmit beam and to compensate for the difference in the transmit beam and receive beam gains in the LBT threshold procedure, for example to ensure that the LBT procedure is effective in preventing the transmitted signal from impacting the medium negatively. Indeed, if there is an existing transmission, performing an LBT may show this existing transmission and prevent a node performing the LBT from transmitting its own signal and corrupting the existing transmission.

Directional LBT may be designed with one or more of the disclosed features. It is contemplated that the features may be implemented singularly or used together in any combination to enable directional LBT.

Multiple independent LBT processes may be enabled for each transmit beam or one or more sets of transmit beams. In one example, each transmit beam or set of transmit beams that may be transmitted simultaneously may be assigned a separate LBT process. It is contemplated that any number of configurable LBT processes may be instantiated and/or executed and may depend on the WTRU capabilities.

Corresponding receive beams may be identified for the LBT procedure. It is contemplated that if beam correspondence holds, the transmit and receive beams may be identical and/or substantially identical.

The power measurement procedure may be configured for each LBT process. In one example, the configuration, also sometime referred to as an LBT measurement configuration, may enable a time restriction on a symbol, mini-slot and/or slot basis.

A 0-dB gain CCA threshold may be modified by the difference in gain between the receive beam and the transmit beam to find the exact effect of the transmit beam on the estimated received power and/or the gain of the transmit beam to compensate for the CCA threshold that is set relative to the 0 dB gain (e.g., dB gain antenna).

A WTRU procedure may be implemented, for example to identify a best receive beam in case of no beam correspondence between a receive beam and a transmit beam. In certain representative embodiments, the best receive beam for a given transmit beam may be identified prior to transmission (e.g., any transmission) in a look-up table.

A WTRU procedure may be implemented, for example to estimate the gain of a receive beam and the gain of a transmit beam of a transmitter/receiver (e.g., any WTRU/gNB/eNB pair) for CCA threshold modification. In certain representative embodiments, these gains may be acquired from a lookup table.

FIG. 6 illustrates directional LBT for beam based transmission. To enable multiple LBT processes, the WTRU may receive, at 610, signaling from the gNB or other Network entity (either RRC (Radio Resource Control), MAC CE (MAC Control Element) or L1 (e.g., physical layer) signaling) that may indicate or explicitly include: (1) the number of LBT processes the WTRU may implement, (2) the WTRU transmit beam and WTRU receive beam for one or more LBT processes (e.g., each process), and (3) the LBT power measurement configuration for one or more LBT processes (e.g., each LBT process).

At 620, the WTRU may identify, from the received signaling, the receive beam for the LBT process. At 630, the WTRU may optionally estimate the gains for the receive and transmit beams.

At 640, the WTRU may measure the power for the LBT process based on the received configuration. For the LBT CCA measurement, the WTRU may adjust, at 650, the CCA threshold for 0 dB gain compensation and for the difference in gains between the receive and transmit beams.

At 660, the WTRU may determine if the medium is free based on the power measurement and the adjusted threshold.

If the CCA succeeds (e.g., the medium is free), the WTRU may transmit its data at 670. However, if the CCA fails (e.g., the medium is busy), the WTRU may defer its transmission at 680.

Additional parameters such as the schedule with which the gNB (and/or other access point and/or network entity) may be switching its own receive beams for a time duration, for example a slot, a mini-slot, a symbol and/or a group of symbols, may also be sent. In one example, a gNB with three beams may send a beam schedule {b1, b1, b2, b2, b3, b3, b1, b1, b1, b2, b2, b3, b3, b1}. This information may enable the WTRU to know possible durations when its own transmit beams may be active and/or facilitate the LBT power measurement.

For LBT processes (e.g., each LBT process), the gNB/WTRU or other transmitters/receivers may send a configuration that determines when an LBT process is to actively measure the power in the channel. By enabling energy measurement with a time restriction, for example, on a symbol/mini-slot or slot basis for the LBT processes (e.g., each LBT process), more accuracy in estimating the energy in the channel for a specific transmission is possible.

Figure 7:
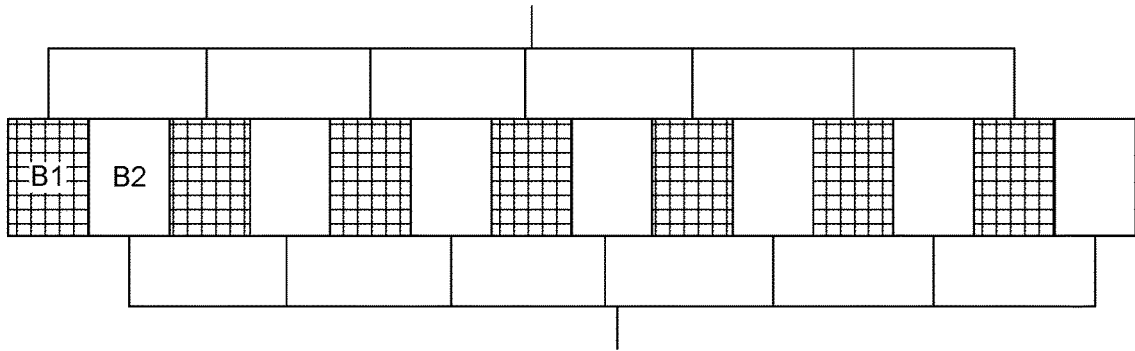
FIG. 7 is a diagram illustrating a representative LBT time domain measurement restriction with no beam aggregation.

FIG. 7 is a diagram illustrating a representative LBT time domain measurement restriction with no beam aggregation.

Referring to FIG. 7, the WTRU and/or gNB may perform an LBT across multiple, non-contiguous instances of a specific beam transmission (in a fixed pattern), for example with a parameter to indicate that the LBT power measurement is to be stopped, reset and/or shortened in time, if the durations in time between the occurrences of the beams are too long. This parameter may depend on the Doppler effect/profile and/or interference profile of the network. For example, the measurement times for a first LBT process 1 associated with a first beam B1 may be a set of non-contiguous intervals and the measurement times for a second LBT process 2 associated with a second beam B2 may be another set of corresponding and interposing non-contiguous intervals.

Figure 8:
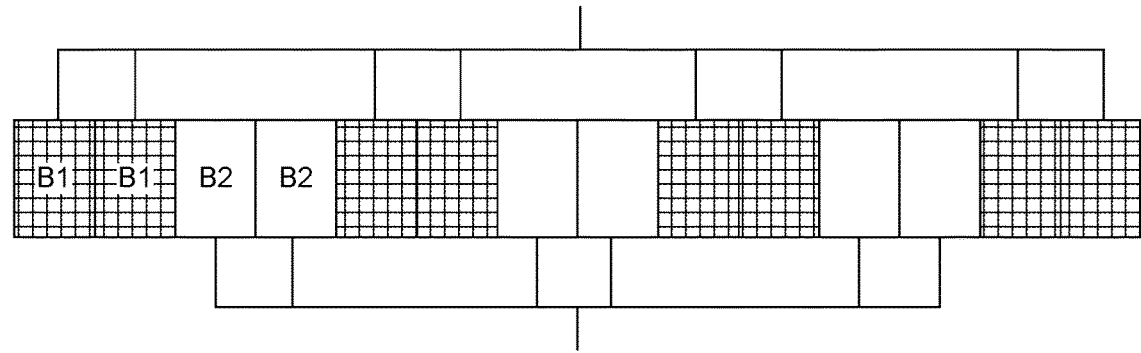
FIG. 8 is a diagram illustrating a representative LBT time domain measurement restriction with beam aggregation.

FIG. 8 is a diagram illustrating a representative LBT time domain measurement restriction with beam aggregation.

Referring to FIG. 8, the WTRU or gNB may set a minimum duration over which a beam may be transmitted to ensure that effect power measurement for CCA is performed (beam aggregation). As an example, it is contemplated that a numerology of 240 kHz is used corresponding to a symbol duration of 2.23 μs. The WTRU/gNB may configure the system to transmit a minimum of 4 symbols consecutively within a single beam to ensure that the beam energy may be measured effectively (e.g., to enable beam aggregation). For example, the measurement times for a first LBT process 1 associated with a first beam B1 and the measurement times for a second LBT process 2 associated with a second beam B2 may be such that two or more measurement intervals for beam B1 may be contiguous followed by two or more measurement intervals for beam B2. This series of measurement intervals may be repeated.

A self-contained slot is one in which the gNB may transmit an ACK to a WTRU within the same slot as the transmission of the WTRU data, for example to reduce the transmission latency. This may require the gNB to transmit on one or more beams to the WTRUs. In one embodiment, due to the short nature of the ACK, the gNB may transmit without an LBT. In one embodiment, the gNB may perform a directional LBT before transmission of the ACK. This may be performed after (e.g., immediately after) receipt of the information and/or before the switch to another beam (e.g., the self-contained transmission per beam may be completed before the switch to another beam). In certain representative embodiments, the gNB may aggregate the ACKs to the multiple beams over the duration of a time window, e.g., that allows for flexibility in scheduling the ACK transmission. This may allow the gNB to switch beams in the case that a beam is deemed as busy due to the CCA procedure. In one embodiment, a WTRU expecting an immediate ACK due to a self-contained transmission may be configured with an additional time window within which the WTRU may expect an ACK before the WTRU assumes/determines that the transmission has failed. This procedure may support a best effort self-contained slot transmission in which the WTRU may or may not receive an ACK, for example due to the gNB being unable to access the channel.

Figure 9:
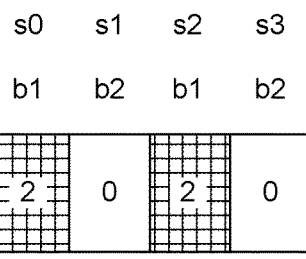
FIG. 9 is a diagram illustrating representative measurement procedures for energy in a channel due to beam switching (e.g., to determine whether the channel is busy or clear) in which a threshold may be set equal to 2.

FIG. 9 is a diagram illustrating representative measurement procedures for energy in a channel due to beam switching (e.g., to determine whether the channel is busy or clear) in which a threshold may be set equal to 2.

Referring to FIG. 9, the gNB may specify a duration over which a CCA measurement is taken and/or a set of measurements that may be compared with the threshold to identify if a beam based interferer is in the vicinity. In an example, the LBT power configuration may measure three different levels. (a) over all time (e.g., over all of the symbols) (b) over even symbols (e.g., just even symbols) or (c) over odd symbols (e.g., just odd symbols). From the measurement results, when a measurement is taken using configuration (a) only (e.g., over all symbols), the channel may be set as clear even though the channel may not be clear. For example, when configuration (b) is used (e.g., the power measured over even symbols s0 and s2), the channel may be set as busy while when configuration (c) is used (e.g., the power measured over odd symbols s1 and s3), the channel may be set as clear. In certain representative embodiments, the WTRU may use a combination of measurements (e.g., measurement criteria and/or time averaging criteria) to make the CCA decision.

For an NR-U transmission, the LBT power configuration LBTConfig, for example, a time domain measurement restriction on a symbol/mini-slot, slot granularity and/or aggregation levels for beam transmissions, may be signaled to the WTRU for LBT CCA. In one example, an LBTConfig may contain or may include MeasRestrictionConfig-time-channel and/or MeasRestrictionConfig-slot/mini-slot/symbol to specify parameters to enable a configuration of a time domain measurement restriction for a channel.

To enable directional CCA measurement, the CCA threshold may be modified by the gain of the beam, for example the receive beam, to ensure that the 0 dB gain thresholds, i.e. the thresholds estimated assuming a 0 dB gain, are kept and the LBT procedure is directional. In addition, the CCA threshold may be modified by the difference in gain between the receive beam used for LBT and the beam to be used for transmitting. In the case of beam aggregation, this difference may be zero. It is contemplated that the CCA threshold may be modified by any of the modifiers. An example in which both modifiers are used is shown below:

CCA Energy detection threshold assuming transmit antenna gain G=x dBi and difference between receive and transmit antennas G_delta=y dBi:

If EIRP=23 dBm at transmitter, Threshold≤−73−x−y dBm/MHz

Otherwise (different transmit power levels, PH)

Threshold=−73 (dBm/MHz)+23 (dBm)−PH−x−y (dBm)

To find the gain of the transmit antenna, a gain discovery procedure may be initiated by the WTRU/gNB. The gain discovery procedure may determine a difference in gain between the WTRU receive beam (Rx beam) and the WTRU transmit beam (Tx beam). To implement this gain discovery procedure, the WTRU/gNB may send a transmission to the receiver during a beam management operation with an omni-directional antenna and may request information and/ or an indication of a received power metric, for example, using any of: Signal to Noise Ratio (SNR), Signal to Interference plus Noise Ratio (SINR), Received Signal Strength Indication (RSSI), Reference Signal Receive Power (RSRP), and/or Received Channel Power Indicator (RCPI)) or the like. During the actual beam management process, the beam based feedback (e.g., each beam based feedback) may include a measure of the received power metric (e.g. SNR, SINR, RSSI, RSRP and/or RCPI, etc.). The difference (in dB) or the ratio (in linear units) between the omni-directional transmission and the beam based transmission may be estimated as the gain (x) used. It is contemplated that in one embodiment, the transmitter may indicate the transmission of the reference (omni-directional) transmission and the receiver may perform the estimation and feed back the gain or a representation/indication of the gain (e.g., an actual value, or a quantized codebook, etc.).

Figure 10:
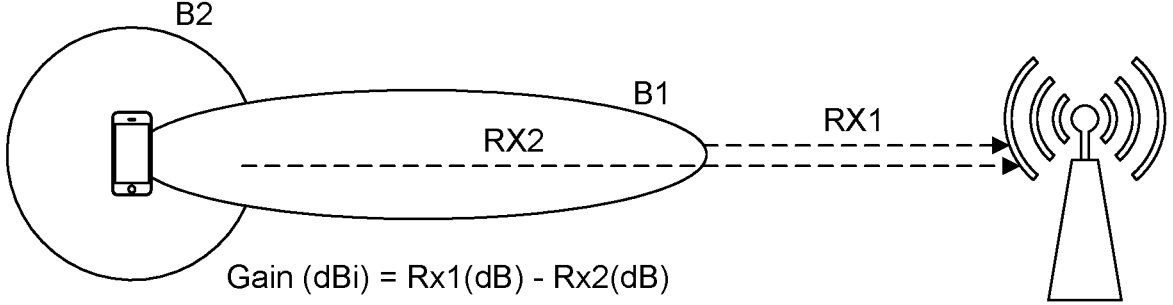
FIG. 10 is a diagram illustrating a representative gain discovery for a transmit beam.
Figure 11:
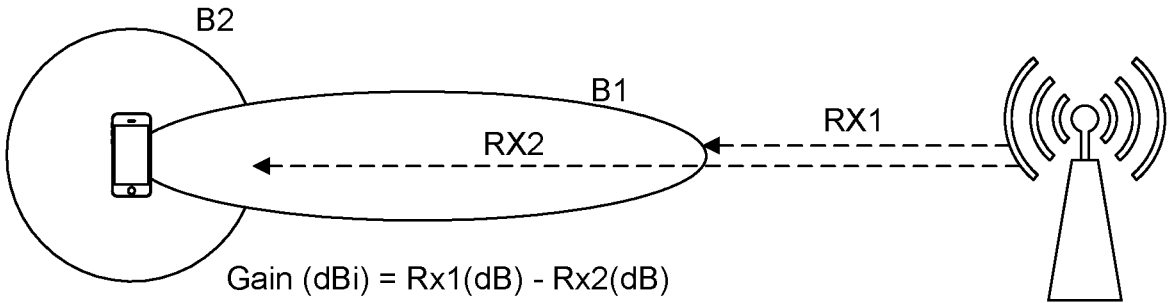
FIG. 11 is a diagram illustrating a representative gain discovery for a receive beam.

FIGS. 10 and 11 are diagrams illustrating a representative gain discovery for a transmit beam and a receive beam.

The gain information (e.g., the gain value and/or an indication of the gain value), and transmit/receive beam association (for scenarios for which there is no beam correspondence) may be pre-estimated (e.g., predetermined) and/or signaled by the WTRU/gNB and for example, placed in a look up table for the WTRU/gNB to use in the CCA estimation during LBT. It is contemplated that the gain discovery procedure may be a separate procedure that may be performed during initial beam discovery for beam management and/or separately at any time.

A procedure detailing the gain discovery for the transmit beam is detailed herein. Referring now to FIG. 10, the gain discovery may include transmitting one or more SRS (Sounding Reference Signal) transmissions using an omni-directional beam B2 and the WTRU transmit (Tx) beam B1 and receiving RSRP measurements of the SRS transmissions. NR may indicate a beam discovery feedback signal, for example, an SRS resource Indicator (SRI), based on an SRS which has been transmitted by the WTRU in a previous time instance where each configured SRS resource is associated with at least one UL Tx beam/precoder. By adding a received power metric to the feedback (e.g. the SRI), the WTRU may be able to estimate its gain in a given direction.

If the UL beam management procedure is gNB directed, then the gNB may need to indicate an SRS resource specifically for omni-directional transmission. In this case, the WTRU may transmit the SRS with an omni-directional manner. The gNB may (a) use the SRS to estimate the gain of all other beams and feed the gain back as part of the feedback; and/or (b) ensure that the feedback includes a power metric and indicate explicitly or implicitly that this feedback is for the omni-directional transmission to allow the WTRU to estimate the gain.

If the UL beam management procedure is WTRU determined and gNB transparent, then the WTRU may indicate a specific SRS transmission, as omni-directional to ensure that the gNB may: (a) use this to estimate the gain of other beams (e.g., all other beams) and feed the gain back as part of the feedback and/or (b) ensure that the feedback includes a power metric and/or indicate explicitly or implicitly that this feedback is for the omni-directional transmission, for example to allow the WTRU to estimate the gain.

In certain representative embodiments, on receiving a set of beam discovery feedback values for the beams that may be used, the WTRU may request that the gNB initiate a gain estimation procedure in which it requests for an SRS transmission using an omni-directional antenna.

It is contemplated that the gNB may perform the same procedure with one or more select WTRUs to estimate the gain of its beams.

Referring now to FIG. 11, to find the gain of a receive antenna, the WTRU may request a gNB transmission including CSI-RS in which the WTRU may set the receive antenna to an omni-directional beam or a quasi-omni-directional beam B2 to receive RX2. This is further to the gNB transmission including CSI-RS in which the WTRU may set the receive antenna to a directional beam B1 to receive RX1. One of skill understands that the direction of one or more transmit beams may be set by using (e.g., by varying) the phase and/or transmit power of signals to one or more particular antennas in an antenna array or multi-array structure and that the direction of one or more receive beams may be set by using (e.g., by varying) the antenna weights of one or more particular antennas in an antenna array or multi-array structure for reception of signals.

FIG. 12 is a flowchart of a gain discovery procedure for a transmit beam. At 1210, the WTRU may send a gain calibration SRS to the gNB. For this transmission, the WTRU may use an omni-directional beam or quasi omni-directional beam. The sent SRS may indicate a gain calibration to the gNB, for example to ensure feedback of the power metric. At 1220, the WTRU may send one or more gain beam SRS(s) to the gNB. At 1230, the WTRU may receive a gain calibration SRI including the power metric from the gNB. At 1240, the WTRU may receive a beam SRI from the gNB. At 1250, the WTRU may estimate the gain of one or more respective beams associated with the one or more gain beam SRSs. At 1260, the WTRU may use an LBT process measurement restriction for LBT, for example which may be on any of: a slot, a symbol and/or a mini-slot level. At 1270, the WTRU may modify the CCA threshold by the estimated gain for LBT.

Although the CCA threshold is disclosed to be modified based on the determined/estimated gain for the LBT, in certain representative embodiments, measurement of power in a channel may be compared to the CCA threshold. In such embodiments, the CCA threshold and/or the measurement in the channel may be modified based on the estimated/determined gain.

In licensed NR transmission, support for changing the transmitted beam on every symbol is provided. To enable this in NR-U, directional LBT may be performed before the beam is switched. This may be implemented using any of the following.

One or more LBT processes or each LBT process may run a continuous CCA power measurement over and/or during a time window (e.g., a moving window). The time duration of the moving window may depend on the beams that may be used (e.g., based on a measurement configuration of the respective LBT process, e.g., based on a time schedule for the LBT process per beam).

FIG. 13 is a diagram illustrating a representative continuous LBT measurement with beam switching in which a plurality of symbols s0, s1, s2 . . . s7 may be sent on a plurality of beams b1 and b2.

Referring to the first example of FIG. 13, the continuous LBT process for beam b1 may include any of: (1) the LBT measurement for symbol s1 to occur on symbol s0; (2) a DCI to be sent on symbol s1; (3) the LBT measurement for symbol s4 to occur on symbol s1, (4) an uplink transmission to occur on symbol s4, and/or (5) the LBT measurement for symbol s5 to occur on symbol s4, among others.

The continuous LBT process for beam b2 may include any of: (1) the LBT measurement for symbol s3 to occur on symbol s2; (2) the LBT measurement for symbol s6 to occur on symbol s3; and/or (3) the LBT measurement for symbol s7 to occur on symbol s6, among others.

In FIGS. 13, 14 and 15, certain symbols are shown hashed to illustrate that the corresponding LBT measurements for those symbols confirmed that the channel was clear/free to send during those symbols. Other symbols are shown without hashing to illustrate that the corresponding LBT measurements for those symbols confirmed that the channel was not clear/not free (e.g., was busy) during those symbols.

Referring to the second example of FIG. 13, the continuous LBT process for beam 1 may include any of: (1) the LBT measurement for symbol s1 to occur on symbol s0; (2) the LBT measurement for symbol s4 to occur on symbol s1; (3) the LBT measurement for symbol s5 to occur on symbol s4; a DCI to be sent on symbol s4; (4) the LBT measurement for symbol s5 to occur on symbol s4; (5) an uplink transmission to occur on symbol s5; and/or (6) the LBT measurement for symbol s7 to occur on symbol s6.

FIG. 14 is a diagram illustrating a representative instantaneous LBT with beam switching in which a plurality of symbols s0, s1, s2 . . . sN may be sent on a plurality of beams b1 . . . bN. In certain representative embodiments, any number of symbols and/or beams may be possible.

Referring to FIG. 14, one LBT process, certain LBT processes or each LBT process may be initiated on receipt of a trigger from the gNB or other network entity, e.g., the DCI and/or any control signal. This may use and/or require a delay between or among any of: (1) the receipt of the DCI, the LBT power measurement and/or the uplink transmission.

In the first example of FIG. 14, the instantaneous LBT process for beam b1 includes any of: a DCI to be sent on symbol s1; (2) the LBT measurement for symbol s5 to occur on symbol s4; and (3) the uplink transmission to occur on symbol s5.

In the second example of FIG. 14 (that includes 9 symbols s0, s1, s2 . . . s8), the instantaneous LBT process for beam b1 may include any of: (1) a DCI to be received on symbol s4; (2) the LBT measurement for symbol s8 to occur in symbol s5; and/or (3) the uplink transmission to occur on symbol s8 that may result in additional transmission delays.

The gNB may send a signal to indicate the beams to be used in the slots. In one example, the beam information may be sent as a part of a Slot Format Indicator (SFI) signal that is used to indicate if a symbol in the slot is uplink, downlink or flexible (e.g., may be used as either uplink or downlink) and the specific beam or beams associated with one or more slots (e.g., each slot). In one example, the beam information may be sent as part of a separate signal (e.g., a Beam Format Indicator, BFI, signal) that may be used to indicate the beam schedule (e.g., the specific beam or beams associated with the one or more slots (e.g., each slot)). It is contemplated that if a beam may be used for transmission in more than one slot (e.g., beam aggregation), the BFI may signal the information for when the beam changes for example to reduce (e.g., only to reduce) the signaling overhead. In one example, the gNB may send an indication of a pending beam change and the time (e.g., the symbol, the slot or the mini-slot) when the change is to occur. This may be sent in an RRC signal, a dedicated signal and/or as part of a broadcast DCI (e.g. the group common DCI) and/or may be sent individually to the WTRUs.

FIG. 15 is a diagram illustrating a representative beam information aided LBT using an SFI or BFI.

Referring to FIG. 15, once the beam scheduling information is received, the WTRU may start the LBT measurement at the appropriate time. In the first example of FIG. 15, the beam aided LBT process for beam b1, may include any of: (1) a DCI to be sent on symbol s1; (2) the LBT measurement for symbol s4 to occur on symbol s1; (3) an uplink transmission to occur on symbol s4; and/or (4) the LBT measurement for symbol s5 to occur on symbol s4.

In the second example of FIG. 15, the beam aided LBT process for beam b1, may include any of: (1) the LBT measurement for symbol s4 to occur on symbol s1; (2) a DCI to be sent on symbol s4; (3) the LBT measurement for symbol s5 to occur on symbol s4; and/or (4) an uplink transmission to occur on symbol s5.

The SFI (e.g., beam information) may include a beam order, e.g., {b1, b1, b2, b2, b1, b1, b2, b2}, that may be used for beam switching. Although the SFI disclosed beam switching using two beams in a particular order, it is possible to provide SFI that includes any beam order, any number of beams and/or any beam sequence.

For multiple beam transmission, there may be multiple scenarios

FIG. 16 is a diagram illustrating a representative multi-beam transmission to/from a single transmission/reception point (TRP).

Referring to FIG. 16, in a first scenario, multiple beams may be used simultaneously. In this case, the carrier sensing mechanism may be implemented independently for two or more beams (e.g., each beam). The sensing procedure may be carried out once at the beginning of the transmission (e.g., prior to transmitting on a channel). It is contemplated that the multi-beam transmission may be to a single TRP or to multiple TRPs. In certain representative embodiments, the transmit and receive beams may be reciprocal and may form beam pairs BP1 (e.g., including transmit beam TB1 and receive beam RB1), BP2 (e.g., including transmit beam TB2 and receive beam RB2) and BP3 (e.g., including transmit beam TB3 and receive beam RB3).

In this representative procedure, the WTRU may receive signaling from the gNB (for example RRC and/or L1 signaling) that may indicate an upcoming gNB beam schedule, the number of LBT processes the WTRU may implement and/or the associated LBT time domain measurement restrictions (and/or the frequency domain restrictions) for one or more LBT processes (e.g., each LBT process). A WTRU may monitor a Physical Downlink Control CHannel (PDCCH) on one or more transmit beams TB1, TB2 and TB3 (e.g., each beam). It is contemplated that the gNB may send an independent PDCCH on the one or more beams TB1, TB2 and TB3 (e.g., each beam) and may allocate resources on all or a subset of the transmit beams TB1, TB2 and TB3. On successful decoding of the PDCCH, for example on the one or more transmit beams TB1, TB2 and B3 (e.g., each beam), the WTRU may perform an LBT independently (e.g., LBT1, LBT2 and LBT3) on receive beams RB1, RB2 and RB3 based on the LBT process and/or parameters for the respective beams TB1, TB2 and TB3. The WTRU may transmit on the beams that are identified as clear and may not transmit on the beams identified as busy/not clear. It is contemplated that the way the WTRU transmits and the gNB decodes the streams may depend on the transmission scheme used.

In one option, each beam with its associated LBT process may send independent, non-coherent data, e.g., multiple independent data streams for example using multiple stream MIMO transmission, to the gNB. In this case, the gNB may identify the success of the transmission by detecting energy on the beam and being able to decode WTRU specific parameters (e.g., the DMRS (DeModulation Reference Signal)).

In one option, each beam and its associated LBT process may send correlated, non-coherent data to the gNB (e.g., by using Cyclic Shift Diversity (CSD)). For example, it may send the same data in such a manner that it is not coherent and may add up to improve the reliability, e.g. using cyclic shift diversity.

In one option, the WTRU may send coherent data on the multiple beams (e.g., using a MIMO transmission). For example, it may send multiple data streams with one or more steams (e.g., each stream) derived from the same data source, e.g., Space Time Block.

In one option, the WTRU may transmit an indication to the gNB identifying beams used.

Figure 17:
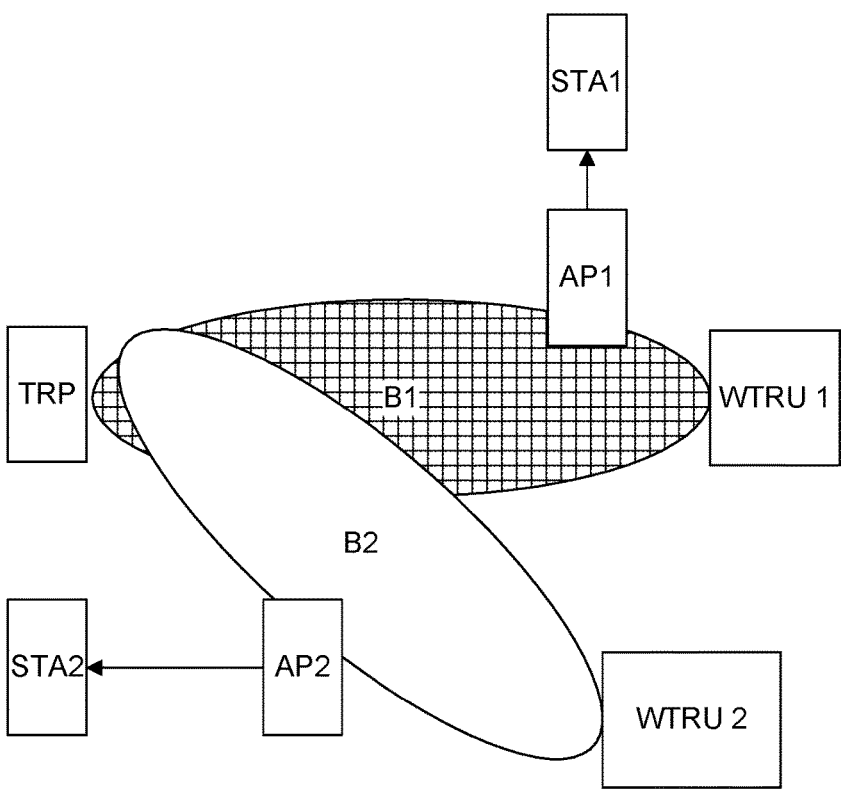
FIG. 17 is a diagram illustrating a TRP transmitting to multiple WTRUs with multiple beams that may be impacted by Wi-Fi networks including first and second access points (AP1) and (AP2)

FIG. 17 is a diagram illustrating a TRP transmitting to multiple WTRUs with multiple beams that may be impacted by other types of RATS (e.g., Wi-Fi networks including first and second access points (APs) AP1 and AP2.

Referring to FIG. 17, in a second scenario, multiple beams B1 and B2 may be used within an MCOT with single beam transmission at each instance. For example, beam B1 may be sent to WTRU 1 in a first time instance and beam B2 may be sent to WTRU 2 in a second, different time instance. In this case, the carrier sensing mechanism may be implemented independently for the beams (e.g., each beam). In this case, a carrier sensing mechanism may be carried out before (e.g., just before) the beams use in the transmission, for example to ensure that during the transmissions, the medium has not been acquired by a separate entity.

Given a scenario with an NR TRP transmitting to multiple WTRUs (e.g., WTRU 1 and WTRU 2) with different beams B1 and B2 and a possibility of Wi-Fi APs AP1 and AP2 in the medium, when switching between beams B1 and B2, the medium may be lost, for example given that the CCA measurement duration in Wi-Fi may be 4 μs which is smaller than the duration of symbols for certain numerologies (e.g., μ=0, 1, 2, 3 and 4 of Table 3). In this example, a directional LBT procedure may be performed before the switch to a new beam.

Figure 18:
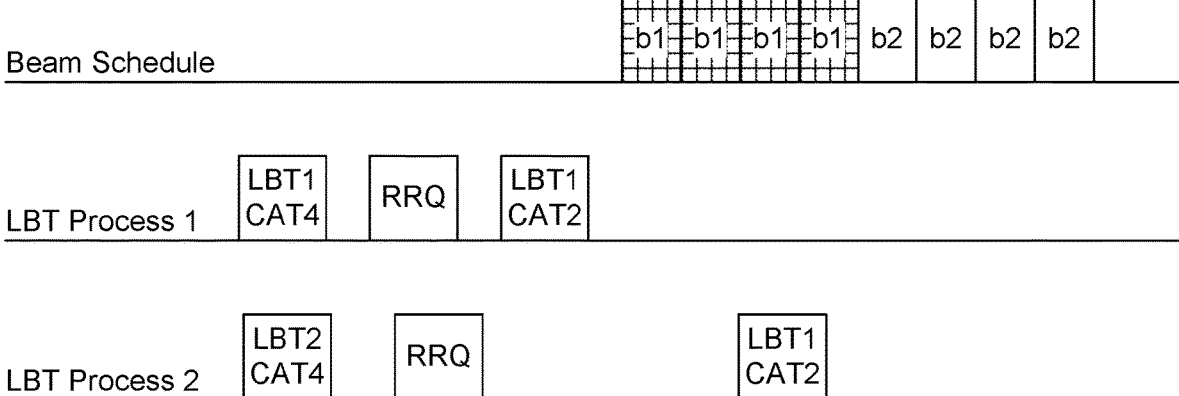
FIG. 18 is a diagram illustrating multiple LBTs for beam switching with Category 2 LBT before beam switching.

FIG. 18 is a diagram illustrating multiple LBTs for beam switching with Category 2 LBT before beam switching.

The first row of FIG. 18 shows the beam schedule, which may include switches between multiple beams b1 and b2 with respective LBT processes LBT process 1 and LBT process 2. The second and third rows of FIG. 18 show a possible procedure for the LBT process 1 on the first beam b1 and the LBT process 2 on the second beam b2. In the represented implementation, the LBT process 1 and/or the LBT process 2 may consist on a Category 4 LBT. When the Category 4 LBT process is successful, the transmitter may send out a radio request (RRQ) with possibly a preamble.

Referring to FIG. 18, to limit the number of hidden nodes, a frame based reservation system may be used in which a radio request (RRQ) may be sent by the transmitter and a radio response (RRS) may be sent by the receiver with information on the MCOT of the transmission. In one embodiment, the RRQ/RRS may contain or include one or more preambles of any identified RATs to assist in multi-RAT channel reservation, for example, if a Wi-Fi network is discovered, a Wi-Fi preamble may be sent as part of an RRC RRQ message, for example to indicate that the network is busy.

In an exemplary procedure, the gNB may perform a full directional LBT, which may be a category 4 LAA LBT on the independent beams b1 and b2 (e.g., each independent beam) for example using a different LBT process (e.g., LBT Process 1 and LBT Process 2) before transmission. The gNB may send an RRQ to a representative WTRU and may request for an RRS to enable the gNB to clear the channel for the MCOT. The WTRU may send an RRS to the gNB in response.

At the beginning of any beam switch, the gNB may perform an LBT and may transmit if the medium is free. It is contemplated that the LBT in this case may be a full directional LBT, for example, a category 4 LAA LBT, or a directional LBT with a fixed duration, for example, a category 2 LAA LBT. The gNB may have multiple beams b1 and b2 (for example with one or more LBTs (e.g., one or more LBT processes) running) to enable the gNB to access the beam or beams that has its/their medium free. It is contemplated that the gNB may indicate a beam schedule (e.g., including the beam order) to enable the WTRUs have an idea of where the next transmission might be occurring.

To reduce the number of exposed nodes and to improve the re-use of the medium, each WTRU may be given information to identify the Group Common (GC) PDCCH of their own and/or neighboring cells to differentiate between downlink traffic from their cell and/or neighboring cells and to adjust their CCA thresholds, accordingly.

To enable the identification of beams without a need for explicit signaling, an "identifiable" energy emission pattern may be sent on the beams (e.g., each beam) to distinguish between a desired signal (for beam management) and interference.

To limit the effect of side lobes on the CCA measurement, an additional omni-directional antenna may be added to the system. The energy received on the omni-directional antenna may be processed to account for the energy in the boresight of the antenna and the energy outside the boresight of the antenna may be subtracted from the total energy to estimate the energy without side lobes.

A gNB may perform LBT for one or more Tx (transmit) beams targeted at/directed to one or more WTRUs, where at least one Tx beam may be targeted at a WTRU. After a successful LBT procedure for a Tx beam, the gNB may transmit the PDCCH within the beam. The gNB may transmit multiple PDCCH each within a beam for a WTRU, if the gNB is not aware of channel access at the WTRU side, for example, the gNB may not be aware of whether any LBT procedure completed successfully by the WTRU. This procedure, e.g., the transmission of multiple PDCCH for a WTRU, may be of benefit as it may cause the WTRU to initiate an uplink transmission by the WTRU.

In order to further explain the gNB behaviors and the WTRU behaviors, the following general example is disclosed. A gNB and a WTRU may engage in a DL transmission and an UL transmission using Time Division Duplex (TDD), which may provide reciprocity. It is contemplated that the gNB and the WTRU are equipped with possibly different size arrays. It is contemplated that after performing one or more beam-based operations, for example, using an NR specification, the gNB may obtain the knowledge that the best set of beam pairs for the WTRU may be as follows (ordered according to a quality metric): beam $(i_1, j_1)$, beam $(i_2, j_2)$, and beam $(i_3, j_3)$, etc. where $(i_1, j_1)$ is the best beam and $(i_2, j_2)$ is the second-best beam, etc. It is contemplated that in general, $i_3$, $i_2$ and $i_3$ may have different values (different beams at the gNB side) and similarly $j_1$, $j_2$ and $j_3$ may have different values (different beams at the WTRU side). While reciprocity is considered in this beam operation, due to the listen-before-talk procedure, the best beam that the gNB may obtain for a clear directional LBT (to send downlink channels (e.g., PDCCH and/or Physical Downlink Shared CHannel (PDSCH) etc.) may not be the beam that the WTRU may obtain for a clear directional LBT at its own side (e.g., when the WTRU attempts to send one or more uplink channels (e.g., (Physical Uplink Control CHannel/Physical Uplink Shared Channel (PUCCH/PUSCH)).

In an embodiment, a gNB may assign a separate PDCCH search space for one or more beams (e.g., each beam), for example, if multiple PDCCH are transmitted to a WTRU. Each PDCCH may use a different beam. The WTRU may perform detection across the multiple search spaces and may detect one or more of the PDCCHs (e.g., depending on the channel quality of the beams and/or if the WTRU changes its receive beams, accordingly). By detection of a PDCCH within a PDCCH search space, the WTRU may associate the search space with the beam pair and/or the WTRU may determine which beam to use for subsequent reception (of one or more other PDCCHs and/or PDSCHs) and/or one or more subsequent transmissions (of one or more PUCCHs or PUSCHs).

A WTRU may perform the PDCCH detection within one or more pre-configured search spaces. A PDCCH search space may be associated with one or more beams. A WTRU that detects one PDCCH within a search space may prepare to transmit, for example in a scheduled PUCCH or PUSCH, in uplink (if any PUCCH or PUSCH is assigned) using the same beam that is associated with the detected PDCCH. The WTRU may perform a directional LBT using the same beam that is associated with the detected PDCCH, and, if completed successfully, the WTRU may transmit any scheduled PUCCH and/or PUSCH within the assigned resources. Taking the above example, it is contemplated that the gNB has successfully performed directional LBT for all the three beams, $\{(i_1, j_1), (i_2, j_2), (i_3, j_3)\}$, and has transmitted multiple PDCCHs and each PDCCH may be within a resource that is associated with one of the beams. Due to the reception condition at the WTRU side, the WTRU may detect one of the beams and the detected beam may or may not be the best beam (e.g. due to potential interference at the WTRU side that may differ from one beam to another beam). For instance, considerate is contemplated that the WTRU may detect the PDCCH within the search space of the beam $(i_2, j_2)$. If the PDCCH initiates an uplink transmission, e.g., indicating a DCI for the WTRU to use a specific PUCCH resource, the WTRU may use the indicated resource. When the gNB detects the PUCCH and/or PUSCH of the WTRU, it equivalently may indicate to the gNB which of the three beams the WTRU has been capable of detecting, (e.g., the beam $(i_2, j_2)$).

In an embodiment, within the scheduled PUCCH resource and/or PUSCH resource, the gNB may monitor all the beams that were used to initially transmit the PDCCH to the WTRU. After this initial transmission, the gNB may gain the knowledge of (e.g., determine) which beam to use for the WTRU that may ensure a successful LBT completion at the WTRU side. Any of the following procedures may be used by a gNB to gain such knowledge (determine which beam to use to provide for a successful LBT operation):

In the first procedure, the gNB may monitor all the uplink resources assigned to the WTRU within a beam (e.g., each beam) that the WTRU may expect to use to send the PUCCH and/or PUSCH. In the above example, the gNB may monitor the uplink resources assigned to the WTRU within one or more beams $(i_1, j_1)$, $(i_2, j_2)$, and $(i_3, j_3)$. Since these resources, by design and/or choice of the gNB, may be separate (e.g., mutually separate) in time and/or frequency, the gNB eventually may only detect the WTRU transmitted PUCCH/PUSCH only within one of the resources (e.g., using WTRU-specific DMRS detection).

In an instance of the above procedure, the gNB may assign multiple resources for PUCCH for the beams (e.g., each beam). For instance, the gNB may assign separate (e.g., mutually separate) PUCCHs in time and/or frequency for one or more beams (e.g., each of the beams). The WTRU may then eventually only use one of these resources for a PUCCH transmission. The gNB eventually may detect the WTRU transmitted PUCCH only within one of the resources.

In another instance, the gNB may assign multiple cyclic shifts of a base sequence to the WTRU such that each of the cyclic shifts may be associated with one beam. The WTRU may eventually only use one of the cyclic shifts for the PUCCH transmission. The cyclic shift that the gNB may detect is associated with the beam the WTRU has been able to detect from the prior PDCCH and/or the beam that the WTRU has used to transmit the PUCCH.

After the above initial multi-beam exchange between a gNB and a WTRU, the gNB may continue to send the PDCCH and/or the PDSCH using the detected beam. In dense deployments, the gNB may prefer to transmit multiple beams, for example, since the channel access condition at the WTRU side may change and/or the directional LBT procedure at the WTRU side for the same beam may not complete successfully. In situations for which the channel access condition at the gNB has changed and/or the gNB may not complete a directional LBT procedure successfully for the same WTRU using the same beam, the gNB may start the above process anew to identify the best beam that also may allow for successful directional LBT completion at the gNB and the WTRU side.

In an embodiment, the beam for which a WTRU may perform a directional LBT successfully may not be the best performing beam, for example, a strongest beam for downlink transmission using a quality metric of choice such as best strength and/or SNR. In such embodiments, the gNB and WTRU may engage in a similar process as above. The gNB may transmit the PDCCH and/or the PDSCH using the best beam and the WTRU may send the scheduled PUCCH and/or PUSCH using one of the beams for which a directional LBT procedure is completed successfully. For this process to complete successfully, first a gNB may transmit a PDCCH using or on multiple beams after a successful directional LBT procedure for each beam. If any PUCCH and/or PUSCH is scheduled, the WTRU may respond using one of the beams for which a directional LBT is performed successfully at the WTRU side. While the gNB monitors multiple beams (or might have assigned mutually separate resources per beam for the WTRU as described above), the gNB may detect the WTRU transmission at or on one beam (e.g., only at one beam). After an initial exchange, the gNB may transmit any PDCCH and/or PDSCH to the WTRU using the best beam (according to a quality metric, for example of the gNB choice) and/or the WTRU may transmit any scheduled PUCCH and/or PUSCH using the beam for which a directional LBT was performed successfully at the WTRU side. The gNB, having already once identified the beam that the WTRU may use to transmit any PUCCH/PUSCH, may not monitor multiple beams afterwards.

A WTRU may perform a directional LBT procedure. In a directional LBT procedure, the WTRU may perform gain discovery and/or may adjust a CCA threshold to account for beam mismatch for non-reciprocal systems. The WTRU may identify a beam direction schedule to enable proper LBT measurements for beam pairs (e.g., each beam/beam pair).

Figure 19:
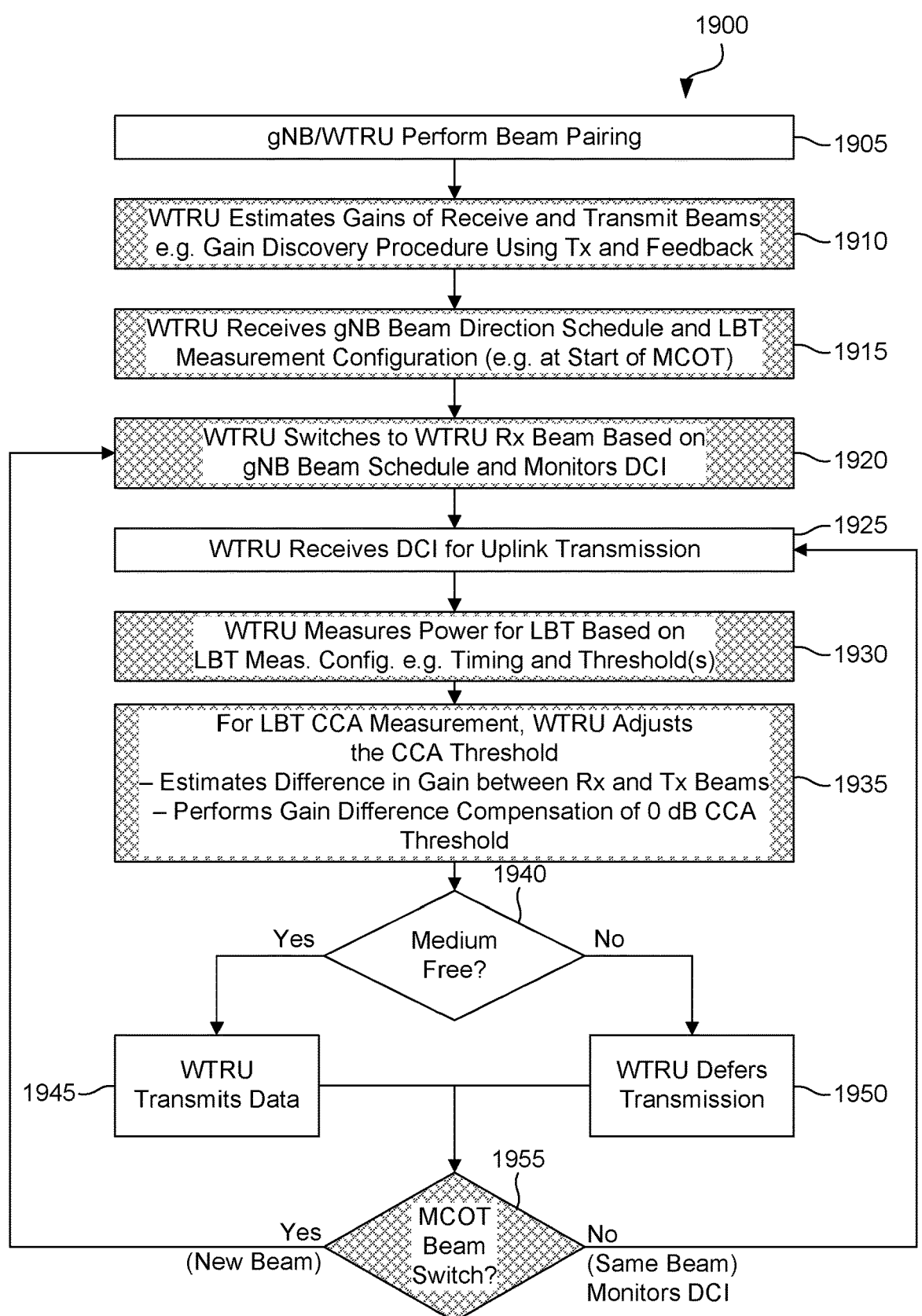
FIG. 19 is a flowchart illustrating a representative directional LBT procedure.

FIG. 19 is a flowchart illustrating a representative directional LBT procedure.

Referring to FIG. 19, the representative directional LBT procedure 1900 may include at 1905, the gNB/WTRU performing beam pairing to identify the transmit/receive beam pairs for transmission. Then, at 1910, the WTRU may estimate the gains of the receive and transmit beam pairs. In one example, the WTRU and/or the gNB may perform a gain discovery procedure using transmission of the beam discovery frame/packet and/or feedback. In one example, the WTRU may send a series of SRS from an omnidirectional beam (for calibration) and/or from one or more other directional beams. The gNB may feed back an SRS Indicator (SRI) that may indicate the received energy/RSSI/RSRP/RCPI for one or more beams (e.g., each beam). The WTRU may use these values to estimate the gain. An example is illustrated in FIG. 20 and disclosed below.

Reverting to FIG. 19, the WTRU may receive at 1915 a gNB beam direction schedule and/or an LBT measurement configuration, for example, at the start of an MCOT. At 1920, the WTRU may switch to the WTRU Rx beam based on the gNB beam schedule indicated at the start of the MCOT and/or may monitor the DCI. At 1925, if there is a transmission for the WTRU, the WTRU may receive a DCI for uplink transmission. On identification of the resources for transmission, the WTRU may measure, at 1930, a power for LBT based on an LBT measurement configuration, for example, that may include timing information and/or threshold information (e.g., indicating certain timing and/or one or more thresholds). For an LBT CCA measurement, at 1935, the WTRU may adjust the CCA threshold or the measured power. The WTRU may estimate the difference in gain between Rx and Tx beams and/or the WTRU may perform a gain difference compensation, for example to adjust a 0 dB CCA threshold or the measured power. The WTRU may then perform a directional LBT using the adjusted CCA threshold for the WTRU Rx beam based on the LBT measurement configuration and may evaluate at 1940 if the medium is free or not free (e.g., busy). If the medium is free, the WTRU may transmit data at 1945. If the medium is busy, the WTRU may defer or stop the transmission at 1950. At 1955, the WTRU may check if there is a switch of the beam (e.g., a MCOT beam). If there is a switch in the MCOT beam (e.g., to another beam and/or new beam), and the WTRU is to change its beam, the processing goes back to 1920. If there is no switch in the MCOT beam (e.g., the same beam is used to monitor the DCI), the WTRU goes back to 1925.

Figure 20:
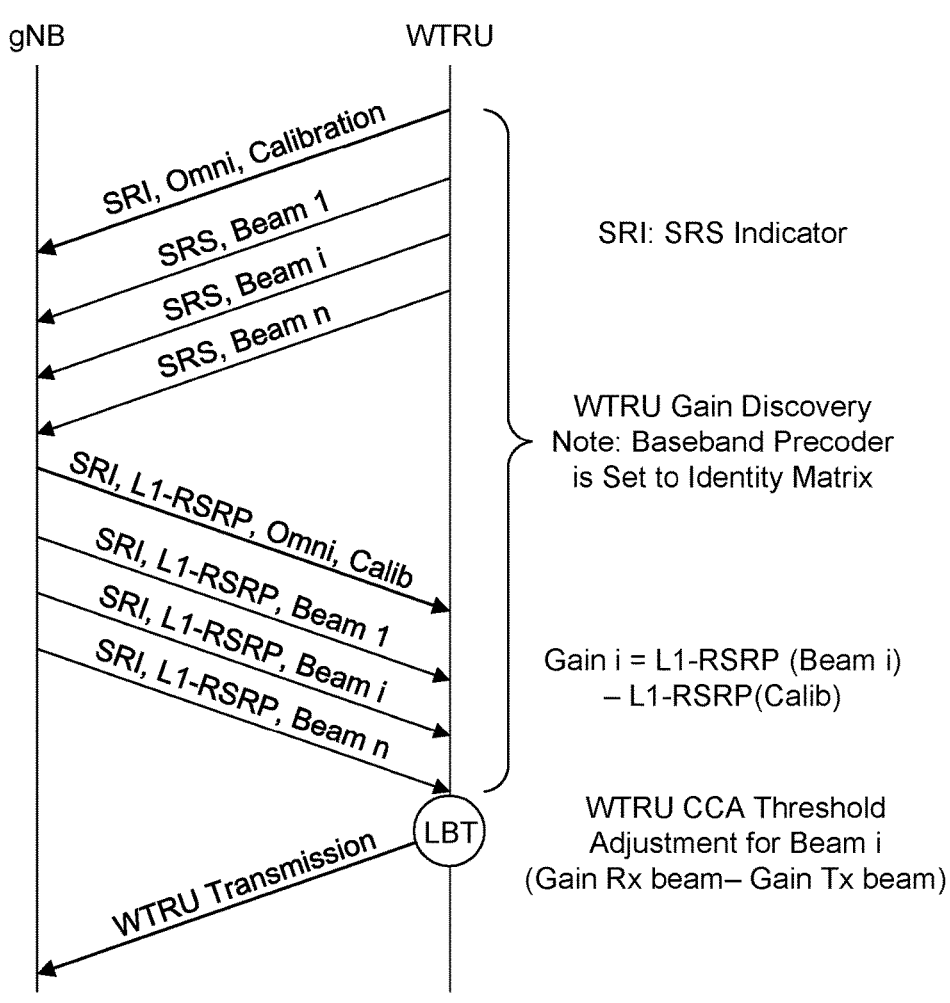
FIG. 20 is a diagram illustrating representative gain discovery timing.

FIG. 20 is a diagram illustrating representative gain discovery timing.

Referring to FIG. 20, the WTRU may use SRIs indicating the received energy/RSSI/RSRP/RCPI values to estimate the gain. For example, the WTRU may send to the gNB a number of signals including, for example, an SRI associated with an omni-directional or quasi omni-directional beam for calibration, and one or more SRSs associated with any number of directional beams (e.g., Beam 1, Beam i, and/or Beam n, among others). After receiving the signals from the WTRU, the gNB may send to the WTRU a number of further signals including, for example, an SRI and layer 1 (L1) RSRP associated with an omni-directional or quasi omni-directional beam for calibration, and one or more SRI and L1 RSRPs associated with the same directional beams (e.g., Beam 1, Beam i, and/or Beam n). The WTRU may determine from the further signals the gain associated with a particular beam and may perform a directional LBT based on the determined beam gain. If the channel is determined to be clear by the WTRU after performing the directional LBT, the WTRU may perform a transmission on the channel.

In licensed access, transmissions from multiple gNBs to a single WTRU may use downlink coordinated multipoint (CoMP)) and transmissions from a gNB to multiple WTRU may be implemented. As the medium is licensed and the gNBs may be synchronized, the gNBs may coordinate for a cooperative transmission. In unlicensed spectrum access, when two or more gNBs are using unlicensed media, the gNBs may not be able to reserve a medium at the same time which may make the coordination between or among the gNBs for cooperative transmission difficult. Representative procedures may be implemented to ensure that multiple gNBs are able to reserve the medium simultaneously, for example CoMP procedures may be used that accommodate the possibility that multiple gNBs are not able to reserve the medium at the same time.

Joint transmission may be used to improve the performance of cell edge users. Base stations may negotiate with a wired and/or a wireless link and joint transmit the same signal to a WTRU so that the WTRU may have a diversity gain and a power gain.

Figure 21:
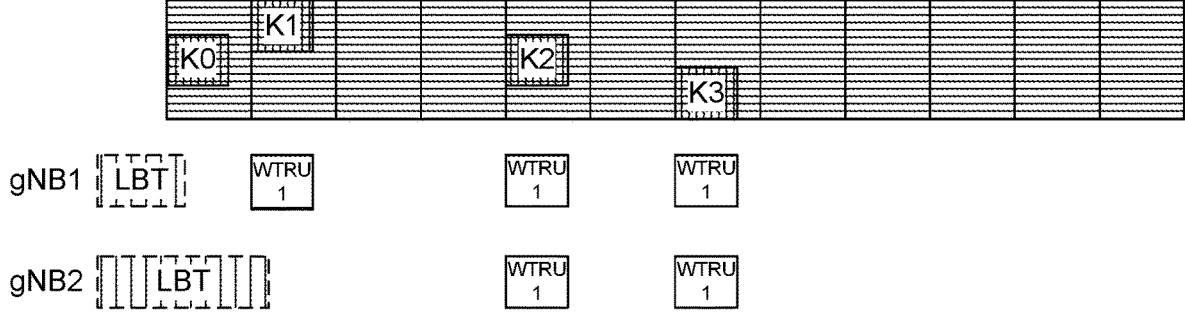
FIG. 21 is a diagram illustrating a representative joint opportunistic coordinated multipoint (CoMP) procedure.

FIG. 21 is a diagram illustrating a representative joint opportunistic coordinated multipoint (CoMP).

Referring to FIG. 21, in an unlicensed band, the negotiated transmission may have to be deferred and/or stopped due to LBT. In this disclosure, an opportunistic joint repetition transmission procedure is disclosed. With this procedure, multiple transmission occasions may be allocated for joint transmission. The gNBs may use these transmission occasions if possible, e.g., when the gNB may have performed LBT and acquired the channel by then.

For example, through wired and/or wireless negotiation, two or more gNBs gNB1 and gNB2 may perform (e.g., agree to perform) joint transmission using multiple transmission occasions (e.g., K repetitions). In this example, transmission allocations K0, K1, K2 and K3 (e.g., any number of transmission allocations such as K=4) may be reserved for joint opportunistic repetition transmission to a WTRU (e.g., WTRU 1).

The gNBs (e.g., gNB 1 and gNB 2) may configure joint repetition transmission using higher layer signaling. The gNBs may have a L1 signal for a more detailed scheduling. The configuration and L1 signaling may include any of the following elements/information: a number of repetitions; time/frequency resource allocations/allocation information; frequency hopping information; and/or beam assignment/beam assignment information.

The gNB (e.g., gNB1) may perform an LBT operation to acquire the channel. The gNB1 may check the allocated joint transmission occasions. It may miss several transmission occasions due to LBT. If scheduled joint transmission occasions are left (e.g., still remain from the allocated joint transmission occasions), the gNB1 may use them to transmit a transport block (TB) to the WTRU 1.

A trigger from the gNB 1, e.g., the DCI, may be transmitted in one transmission occasion, some transmission occasions or each transmission occasion. The DCI may be transmitted from the gNB 1 to the WTRU 1 as a trigger for uplink transmission. An LBT may be performed before the uplink transmission depending on the scenario, e.g. if the turnaround between the DCI and the uplink transmission is less than a threshold (e.g., 16 μsec), then an LBT may not be used and/or needed but if the turnaround between the DCI and the transmission is equal to or greater than the threshold, then the LBT may be used and/or needed. In the DCI, the number of upcoming repetition transmissions may be included. The gNB (e.g., gNB2) may do the same thing.

It is contemplated that the disclosed joint repetition transmission scheme may be applied to a licensed band. In that case, the LBT operation may not be performed. The disclosed procedure may be applied to coherent and/or non-coherent joint transmission. Non-coherent joint transmission may not need synchronization between the transmission points (e.g. gNB1 and gNB2) and may use techniques like single-frequency network (SFN) or cyclic delay diversity (CDD) schemes, which may target diversity gains and may enable increased transmit power to the WTRU. On the other hand, coherent joint transmission may need and/or use tight synchronization and may be based on spatial CSI feedback relative to two or more transmission points (e.g., gNB1 and gNB2), which can be used to perform MIMO transmissions from the corresponding antennas of the transmission points (e.g. use the multiple transmission points as one large MIMO system).

3GPP NR currently supports periodic uplink Sounding Reference Signals (SRSs) (e.g., transmitted at a fixed time interval from when it is configured), semi-persistent uplink SRSs (e.g., configured and then transmitted a number of times over a plurality of intervals for example at a fixed time within each interval) from when a DCI triggers it) and aperiodic uplink SRSs (e.g., transmitted once after a DCI trigger), downlink CSI-RS, interference measurement and/or uplink CSI-reporting procedures. The design of the SRS, CSI-RS and/or CSI-RS feedback may consider the uncertainty in medium access in the unlicensed spectrum, and that the transmissions may be subject to LBT. To enable a form of semi-persistent or periodic CSI-RS and CSI-RS reporting, the gNB may perform one or more of the following actions. The gNB may transmit one type of signal (e.g., the CSI-RS, CSI-reporting or SRS) within a periodic transmission window, for example to accommodate the variability of transmission due to LBT that does not allow for perfectly periodic transmission. The gNB may group the independent CSI-RS, CSI-reporting and any SRS for multiple WTRUs together to minimize the use of multiple LBTs, as opposed to allowing for independent transmissions to or from each WTRU. The gNB may reduce the overhead compared with aperiodic procedures, for example by using a single triggering mechanism (e.g., the DCI and/or other downlink signaling, among others) to trigger the grouped (periodic/semi-persistent) signal requests and/or to indicate a relative position of a signal-resource to the triggering DCI (e.g., the DCI may indicate resources that signals may use, e.g., a signal CSI-RS1 may use x symbols and CSI-RS2 may use y symbols).

Even with periodic CSI-reporting, the WTRU may fail to respond due to an LBT procedure failure. Procedures/operations and apparatus to mitigate the effect of this failure are disclosed herein.

CSI-Reporting may be performed with uncertainty due to LBT. To increase the probability that a CSI-report is received, the CSI-report may be configured for K-repetitions made up of both grant-based (e.g., the gNB may explicitly indicate to the WTRU the resources to transmit in) and grant-free (e.g., the WTRU may decide to transmit by itself, for example based on some general configuration received from the gNB) attempts to access the channel. In a simple example, it is contemplated that K=K1 (grant-based)+K2 (grant-free) repetitions.

FIG. 22 illustrates an exemplary MCOT with scheduled repetitions K1=2 and grant free repetitions K2=1. Referring to FIG. 22, the grant based repetitions may be configured based on relative time slots and/or frequency locations to the CSI-RS transmission and/or may be configured to transmit based on a DCI transmission for a group of WTRUs.

The WTRU may perform an LBT, for example to ensure that it may access the channel at the scheduled time. In one example, the WTRU may perform an LBT for a fixed duration, for example to ensure that the channel is free at the scheduled time of transmission, which is similar to category 2 LBT in LAA. In one example, the WTRU may perform an LBT with a fixed contention window size, which is similar to category 3 LBT in LAA.

All or a sub-set of the repetitions may be transmitted without the expectation of an ACK and/or NACK from the gNB. In an example, if K=4. The WTRU may be configured semi-statically (e.g., via RRC messaging or broadcasts) or dynamically (via L1 or L2 signaling) to transmit two CSI-Reports before expecting an ACK or a NACK, for example to reduce the latency, to increase the reliability of the report and/or to accommodate that the ACK/NACK from the gNB may be delayed due to a failed CCA or may be lost due to one or more collisions.

The transmission attempts may be terminated once an ACK is received.

The type of feedback and/or the feedback channel may be preconfigured based on the repetition number (e.g., if the WTRU is configured to transmit up to four times, the repetition number may correspond to the index of the repetition, e.g., 1, 2, 3 or 4). In one example, an overhead of the feedback type may be reduced as the repetition number increases as shown in Table 4.

TABLE 4

| Preconfigured channel and feedback type for CSI feedback | | |
|---|---|---|
| Repetition number | Channel | CSI-Feedback Type |
| 1 | PUSCH | Type II, Parts 1 and 2 |
| 2 | PUCCH | Type 1, wideband/subband |

It is contemplated that the preconfiguration may allow a mix of channels and feedback types with one DCI activation. On failure of the grant based (e.g., all the grant-based) transmissions, the WTRU may switch to grant free transmissions within a grant free resource dedicated for the CSI feedback. The grant free repetitions may be configured based on: relative time slots and/or frequency locations to the CSI-RS transmission and/or the grant-based transmissions. The WTRU may performs an LBT with some form of random back off to accommodate the additional competition from multiple WTRUs vying for the grant free resource. All (or a sub-set) of the repetitions may be transmitted without the expectation of an ACK and/or a NACK from the gNB. Termination of the transmission attempts may be allowed once an ACK is received. The grant free CSI report type may be pre-configured, e.g., Type 1 CSI on a wideband channel only may be allowed. The grant may be based on and/or scheduled by a CSI-Report and may occur on any of the PUSCH and/or the PUCCH. The determination/choice of the specific channel may be gNB directed. The grant free transmission may be reserved for any of: a PUSCH and/or PUCCH, and both channel types may be multiplexed.

In one example, a grant free resource may be set up as autonomous uplink resources to allow the WTRUs to compete for the resources. In cases for which there is no PUCCH resource available, the WTRU may multiplex the uplink control information (UCI) and/or CSI feedback on the PUSCH.

In scenarios for which the scheduled repetition windows/ regions are in different MCOTs, a procedure/mechanism may be implemented to check if the channel is clear.

In one embodiment, the repetitions may be truncated/ reduced/stopped once the MCOT is completed.

FIG. 23 is a diagram illustrating a representative MCOT with LBT before repetition regions (e.g., each repetition region).

Referring to FIG. 23 which shows one or more CSI-RS regions and associated CSI-reporting regions, the reporting regions may have scheduled/granted resources (K1) with 2 repetitions (K1,1) and (K1,2) and non-scheduled/grant-free resources (K2) with only 1 repetition (K2,1). Before each region, an LBT may be performed. As represented, one or more regions may perform independent LBTs. such that a first LBT transmission opportunity may occur and/or may be scheduled before, for example the CSI-RS signaling (e.g., CSI-RS region), a second LBT transmission opportunity may occur and/or may be scheduled before, for example a first repetition of a scheduled CSI report, a third LBT transmission opportunity may occur and/or may be scheduled before, for example a second repetition of the scheduled CSI report, a fourth LBT transmission opportunity may occur and/or may be scheduled before, for example a first repetition of a grant free CSI report. As shown in FIG. 23, further LBT transmission opportunity may occur before and/or after these four LBT transmission opportunities.

Figure 24:
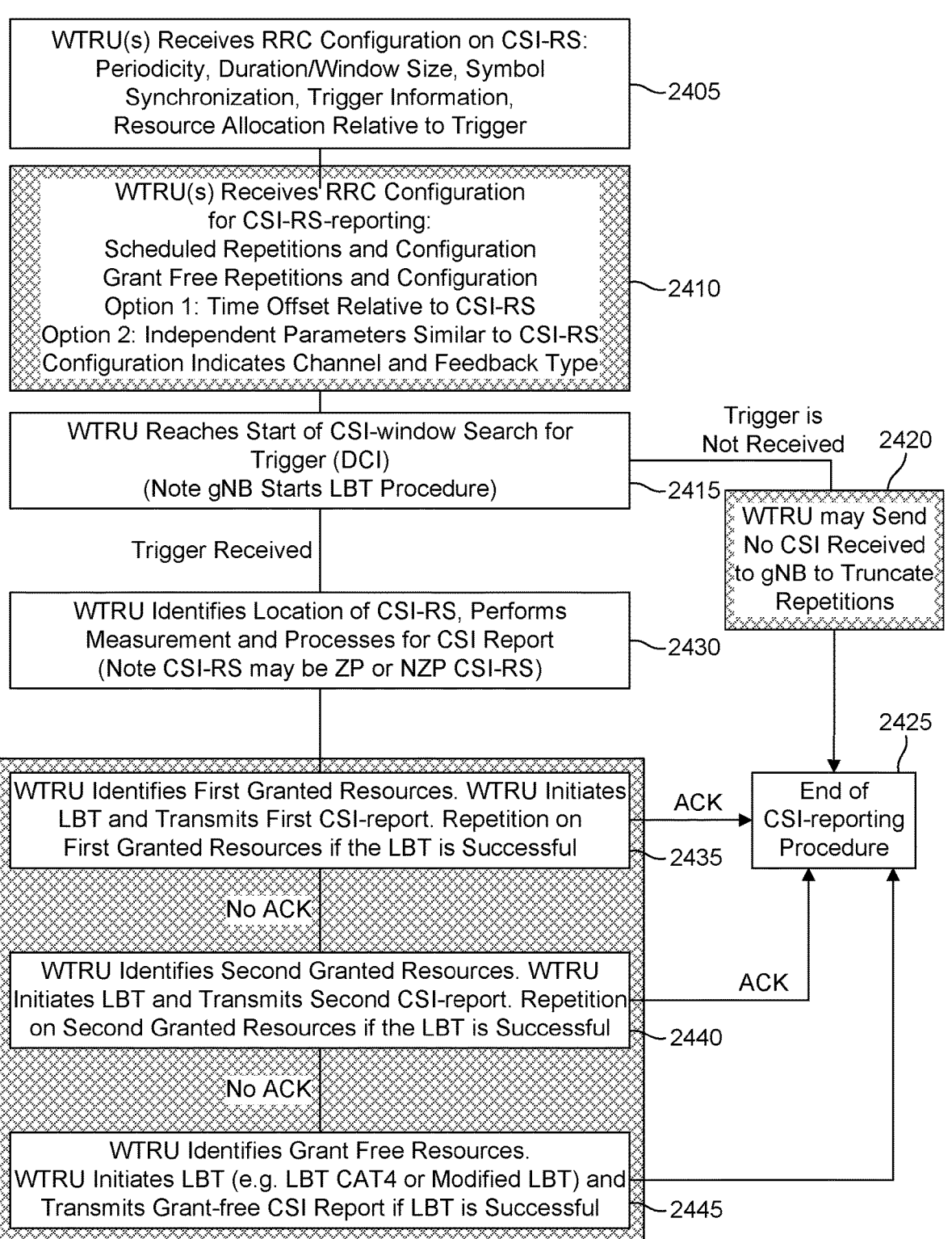
FIG. 24 is a flowchart illustrating a representative WTRU procedure for channel state information (CSI) reporting in NR unlicensed (NR-U)

FIG. 24 is a flowchart illustrating a representative WTRU procedure for channel state information (CSI) reporting in a NR-U for example using the MCOT of FIG. 23.

The representative procedure may include any of the following. At 2405, the WTRU may receive an RRC configuration for CSI-RS. The CSI-RS configuration may identify the periodicity, the duration/window size, the symbol synchronization, the trigger information and/or the resource allocation relative to trigger, among others. At 2410, the WTRU may receive the RRC configuration associated with CSI-RS reporting. The CSI-RS reporting configuration may identify any of: the number of repetitions, the type of repetitions, the type of feedback channel (e.g., PUCCH, PUSCH and/or grant-free) and/or the resources dedicated to the CSI-RSs. In one embodiment, one or more repetitions (e.g., each repetition) may be identified as occurring within a window that may be triggered by the gNB. In this case, the one or more repetitions (e.g., each repetition or group of repetitions) may be triggered by a DCI. In one embodiment, the one or more repetitions (e.g., each repetition) may be identified based on a relative resource from the CSI-RS window. In this case, the CSI-RS DCI may trigger the entire CSI-RS transmission and reporting procedure across multiple WTRUs, feedback channel types, and feedback types etc. In a first option, the RRC configuration associated with CSI-RS reporting may indicate a time offset relative to the CSI-RS. For example, the CSI-RS may be two slots after the DCI and the CSI-RS report may be 2 slots after the CSI-RS. In a second option, the RRC configuration associated with the CSI-RS reporting may indicate independent parameters similar to the RRC configuration for the CSI-RS. For example, the CSI-RS may be two slots after the DCI and the CSI-report may be 4 slots after the DCI. In both examples, the same resource is concerned.

At 2415, the WTRU may reach the start of the CSI window and may search for a trigger (DCI) while the gNB may start the LBT procedure.

If no trigger is received, the WTRU may send at 2420 an indication that no CSI is received to the gNB to truncate repetitions. The CSI reporting procedure may then end at 2425.

If a trigger is received, the WTRU may identify the location of the CSI-RS and/or may perform measurement and/or processes for CSI report. The CSI-RS may be ZP (Zero Power) and/or NZP (Non-Zero Power) CSI-RS.

In one example, K=3 with K1=2 and K2=1. The WTRU may identify at 2435 the resources for the first scheduled CSI-report and may perform an LBT to enable access to the channel at the exact scheduled time (e.g., a category 2 or category 3 LAA LBT). On establishing that the medium is clear, the WTRU may transmit the first CSI-report repetition. If the WTRU receives an ACK, the procedure may be truncated at 2425. The gNB may be free to re-purpose the resources for other retransmissions.

If the WTRU does not receive an ACK, the WTRU may identify at 2440 the resources for the second scheduled CSI-report and may perform an LBT to enable access to the channel at the exact scheduled time (e.g., a category 2 or category 3 LAA LBT). On establishing that the medium is clear, the WTRU may transmit the second CSI-report repetition. If the WTRU receives an ACK, the procedure may be truncated at 2425 and the gNB may be free to re-purpose the resources for other retransmissions.

If the WTRU does not receive an ACK, the WTRU may identify at 2445 the resources for the grant free CSI-report and may perform an LBT to enable randomly access to the grant free channel. (e.g., a category 4 or modified LBT). In one example, the WTRU may perform a 2-stage access protocol in which the WTRU may select a resource. For example, the WTRU may generate a random number (N_r) between 0 and N_gen, where N_gen is assigned by the gNB (e.g., N_gen may depend on the number of WTRUs the gNB estimates as using random access and the number of resources to be allocated). If N_r is greater than the number of grant free resources, the WTRU may not access the channel. If N_r is less than the number of grant free resources, the WTRU may: (a) select the grant free resource associated with the N_r; or (b) generate a second random number N_a and select the grant free resource associated with N_a.

An LBT may be performed on the resource for transmission. The WTRU may then perform an LBT with either a fixed duration (for example a Category 2 LAA LBT) and/or with a fixed backoff (for example a Category 3 LAA LBT).

It is contemplated that additional schemes to enable grant free access in an unlicensed resource may also be applicable. On establishing that the medium is clear, the WTRU may transmit the grant free CSI-report repetition. A channel is generally defined herein as one or more resources (e.g., physical resources, such as frequency resources including but not limited to: (1) one or more adjacent or non-adjacent frequencies; (2) one or more adjacent or non-adjacent frequency bands; (3) one or more adjacent or non-adjacent BWPs and/or (4) one or more adjacent or non-adjacent component carriers, among others. The channel may be used to carry multiplexed data and/or control signaling for uplink, downlink and/or sidelink transmissions.

Figure 25:
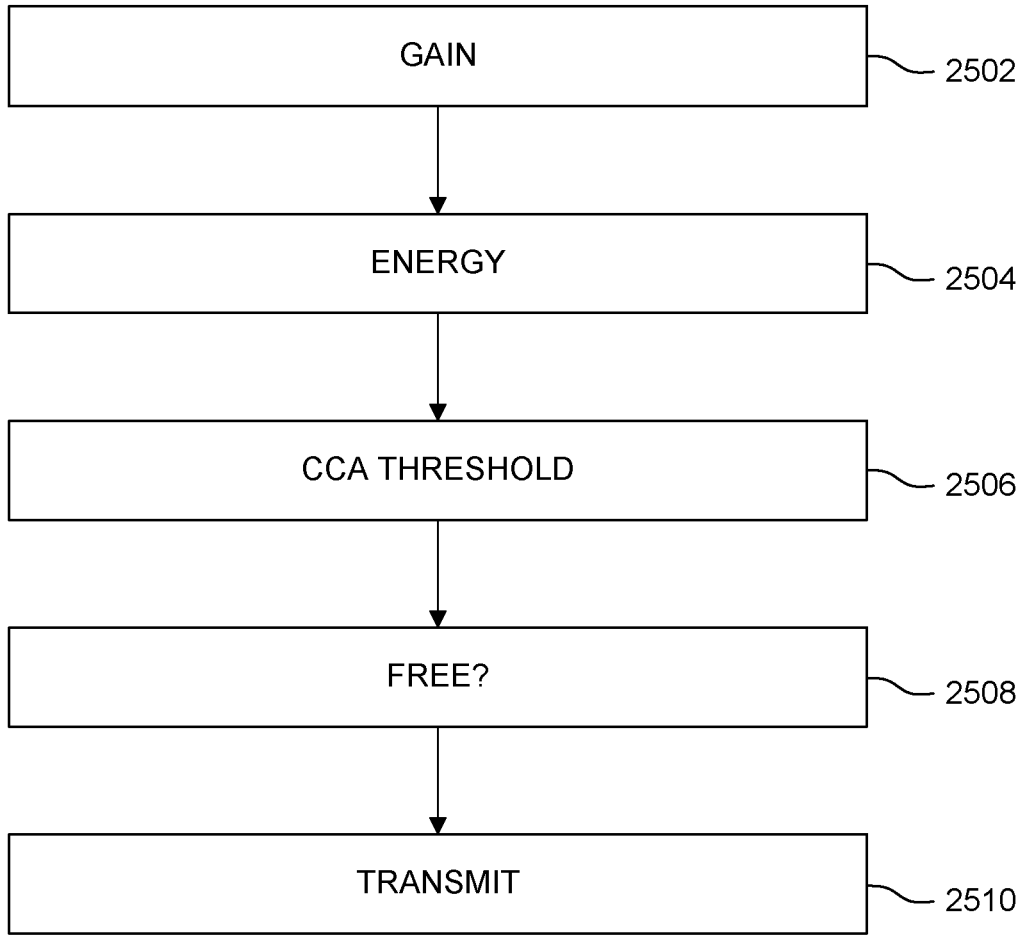
FIG. 25 is a flowchart illustrating a first embodiment of an LBT method.

As a conclusion, a first example of the present disclosure relates, with reference to FIG. 25, to a listen before talk (LBT) method performed by a wireless transmit/receive unit (WTRU). The method may comprise any of:

determining 2502 a gain of at least one beam;

measuring 2504 energy in a channel;

adjusting 2506 one of a clear channel assessment (CCA) threshold or the measured energy in the channel based on the determined gain;

determining 2508 whether the channel is free based on: (1) the measured energy and the adjusted CCA threshold or (2) the adjusted measured energy and the CCA threshold; and/or transmitting 2510 data on condition that the channel is free.

The following features of the LBT method may be advantageously implemented alone or in various combinations:

the method may further comprise receiving, by the WTRU from a next generation Node B (gNB), a configuration including beam management information, wherein the measuring of the energy in the channel is performed in accordance with the beam management information included in the received configuration;

the determining of the gain of the at least one beam may comprise determining the gain of any of: a receive beam or a transmit beam;

the method may comprise determining a gain difference between the receive beam and the transmit beam;

the adjusting the CCA threshold may comprise compensating for the determined gain difference;

the adjusting of the CCA threshold may comprise compensating for the gain of the receive beam;

the channel may be in an unlicensed spectrum;

the measuring of the energy may comprise determining any of: a signal to noise ratio (SNR), a signal to interference plus noise ratio (SINR), a received signal strength indication (RSSI), a reference signal received power (RSRP), or a received channel power indicator (RCPI);

the measuring of the energy may comprise running a continuous energy measurement using a moving window;

the method may comprise receiving a trigger included in or indicated by Downlink Control Information (DCI);

the method may comprise receiving and/or decoding a Physical Downlink Control CHannel (PDCCH) carried on the at least one beam, another beam, a frequency band without beamforming, wherein the determining of whether or not the channel is free may be performed on condition that the PDCCH decoding is successful;

the transmitting of the data on condition that the channel is free may comprise transmitting the data on a plurality of beams on condition that each one of the plurality of beams is free;

the transmitted data on a respective beam of the plurality of beams may comprise any of: independent non-coherent data, correlated non-coherent data, coherent data, or control signalling;

the method may comprise transmitting an indication of the beams used for transmitting the data; and/or the method may comprise deferring or stopping the data transmission on the channel on condition that the channel is not free.

A second example of the present disclosure relates, with reference to FIG. 1B, to a wireless transmit/receive unit (WTRU) 102 that may comprise any of:

a processor 118 configured to any of:

determine a gain of at least one beam measure energy in a channel;

adjust one of: a clear channel assessment (CCA) threshold or the measured energy in the channel based on the determined gain; and/or determine whether or not the channel is free based on: (1) the measured energy and the adjusted CCA threshold or (2) the adjusted measured energy and the CCA threshold; and/or a transmit/receive unit 120 configured to transmit data on condition that the channel is free.

The following features of the WTRU may be advantageously implemented alone or in various combinations:

the transmit/receive unit may be configured to receive from a next generation Node B (gNB) a configuration including beam management information and the processor may be configured to measure energy in the channel in accordance with the received configuration;

the processor may be configured to determine a gain of any of: a receive beam or a transmit beam;

the processor may be configured to determine a gain difference between the receive beam and the transmit beam;

the processor may be configured to adjust the CCA threshold, for example by compensating for the determined gain difference;

the processor may be configured to adjust the CCA threshold, for example by compensating for the gain of the receive beam;

the transmit/receive unit may be configured to receive a trigger;

the trigger may be included in or indicated by Downlink Control Information, DCI;

the transmit/receive unit may be configured to receive a Physical Downlink Control CHannel (PDCCH) on at least one beam, and the processor may be configured to decode the PDCCH carried on the at least one beam, another beam, a frequency band without beamforming, and/or to determine whether or not the channel is free on condition that the PDCCH decoding is successful;

the transmit/receive unit may be configured to transmit the data on a plurality of beams on condition that each one of the plurality of beams is free;

the transmit/receive unit may be configured to transmit an indication of the beams used for transmitting data; and/or the processor may be configured to defer or to stop the data transmission on the channel on condition that the channel is not free.

Figure 26:
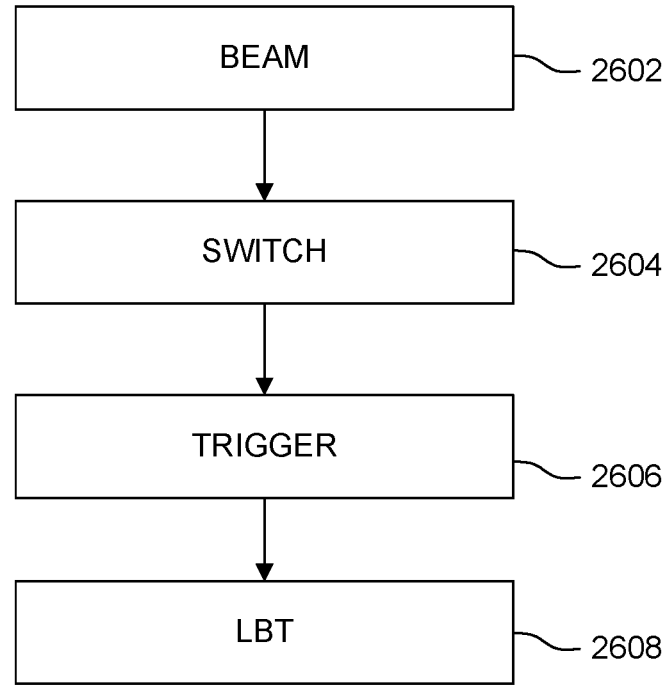
FIG. 26 is a flowchart illustrating a second embodiment of an LBT method.

A third example of the present disclosure relates, with reference to FIG. 26, to a method for listen before talk (LBT). The method may comprise any of:

receiving 2602 a configuration including or indicating beam management information from a next generation Node B (gNB);

switching 2604 to a receive beam based on the beam management information;

monitoring for and/or receiving 2606 a trigger to perform an LBT process for the switched receive beam; and/or performing 2608 the LBT process for the receive beam based on the received trigger.

The following features of the LBT method may be advantageously implemented alone or in various combinations:

the trigger may be included in or indicated by Downlink Control Information (DCI);

the method may comprise receiving the beam management information at a start of a maximum channel occupancy time (MCOT);

the beam management information may comprise a beam direction schedule; and/or the configuration including or indicating beam management information may comprise a pattern and/or a coding of a reference signal.

A fourth example of the present disclosure relates, with reference to FIG. 1B, to a wireless transmit/receive unit (WTRU) 102 that may comprise any of:

a transmit/receive unit 120 configured to:

receive beam management information from a next generation Node B (gNB), and/or monitor for a trigger indicating to perform an LBT process; and/or a processor 118 configured to:

switch from a first receive beam to a second receive beam based on the received beam management information, and/or wherein the transmit/receive unit and the processor are configured to perform the LBT process on the second receive beam on condition that the monitored for trigger is received.

The following features of the WTRU are advantageously implemented alone or in various combinations:

the trigger may be included in Downlink Control Information (DCI);

the DCI may be used for an uplink transmission of the WTRU;

the transmit/receive unit may be configured to receive the beam management information at a start of a maximum channel occupancy time (MCOT);

the beam information may comprise a beam direction schedule; and/or the configuration including or indicating beam management information may comprise a pattern and/or a coding of a reference signal.

Figure 27:
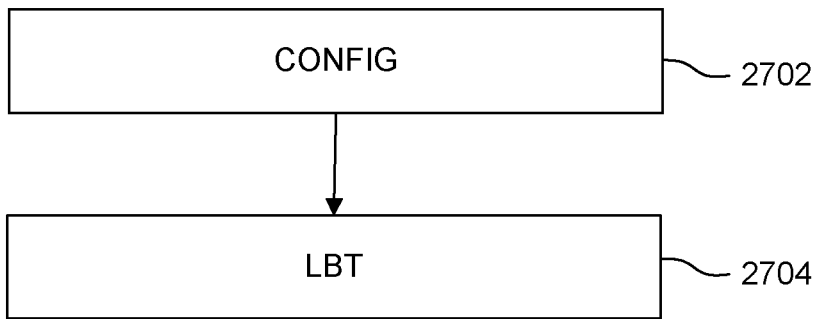
FIG. 27 is a flowchart illustrating a third embodiment of an LBT method.

A fifth example of the present disclosure relates, with reference to FIG. 27, to a method for directional listen before talk (LBT). The method may comprise any of:

receiving 2702 a configuration to enable performance of a directional LBT process associated with a beam according to beam direction schedule information indicated in a configuration; and/or performing 2704 the directional LBT process using the received configuration.

The following features of the method for directional LBT may be advantageously implemented alone or in various combinations:

the beam direction schedule information is included in or indicated by a Slot Format Indicator (SFI) signal and/or a Beam Format Indicator (BFI);

the method may comprise performing beam pairing to identify transmit/receive beam pairs for transmission;

the method may comprise estimating gains of the receive and transmit beam pairs;

the method may comprise performing a gain discovery procedure using a transmission of a beam discovery frame/packet and/or feedback information from a gNB; and/or the gain discovery procedure may comprise transmitting a Sounding Reference Signal (SRS) and/or receiving information comprising an SRS resource Indicator (SRI). A sixth example of the present disclosure relates, with reference to FIG. 1B, to a wireless transmit/receive unit (WTRU) 102 that may comprise:

a transmit/receive unit 120 configured to receive a configuration to enable a directional LBT process associated with a beam according to a beam direction schedule information indicated in the configuration; and/or a processor 118 configured to perform a directional LBT process using the received configuration.

The following features of the WTRU may be advantageously implemented alone or in various combinations:

the transmit/receive unit may be configured to receive a Slot Format Indicator, SFI, signal or a Beam Format Indicator (BFI);

the processor may be configured to perform beam pairing to identify transmit/receive beam pairs for transmission;

the processor may be configured to estimate gains of the receive and transmit beam pairs;

the processor may be configured to perform a gain discovery procedure using a transmission of a beam discovery frame/packet and/or feedback information from a gNB; and/or the transmit/receive unit may be configured to transmit a Sounding Reference Signal (SRS) and/or to receive information comprising an SRS resource Indicator (SRI).

Figure 28:
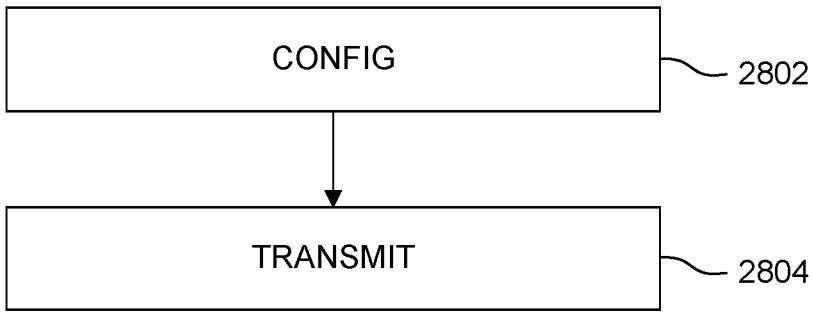
FIG. 28 is a flowchart illustrating an embodiment of a method for coordinated multipoint transmission.

A seventh example of the present disclosure relates, with reference to FIG. 28, to a method for coordinated multipoint (CoMP) transmission, performed by a first next generation Node B (gNB), that may comprise any of:

negotiating 2802, by the first gNB with one or more further gNBs, a joint transmission configuration, according to which the first and further gNBs are allocated a number of transmission occasions to jointly transmit data to at least one wireless transmit/receive unit (WTRU); and/or transmitting 2804, by the first gNB, data to the at least one WTRU using the negotiated configuration.

The following features of the method for COMP transmission may be advantageously implemented alone or in various combinations:

the negotiation may be performed through a wired and/or a wireless link between or among the first gNB and the one or more further gNBs;

the negotiation may be performed using physical layer and/or higher layer signaling;

the method may comprise transmitting physical or higher layer signaling to the at least one WTRU including any of: the joint transmission configuration or the joint transmission schedule include any of: the number of transmission occasions, time/frequency resource allocations, frequency hopping information and/or a beam assignment;

the method may comprise receiving the joint transmission configuration from a core network;

the method may comprise performing, by the first gNB, an LBT process to acquire a channel defined by a set of frequency resources between the first gNB and the WTRU prior to transmitting data on the channel;

on condition that a transmission occasion is missed due to the LBT process, data may be transmitted using a next configured transmission occasion; and/or the method may comprise determining that one of the one or more further gNBs has successfully performed an LBT process to acquire a channel prior to the first gNB transmitting data on the channel on condition that a joint transmission configuration is negotiated with at least the one gNB enabling a joint transmission occasion by at least the one gNB and the first gNB.

Figure 29:
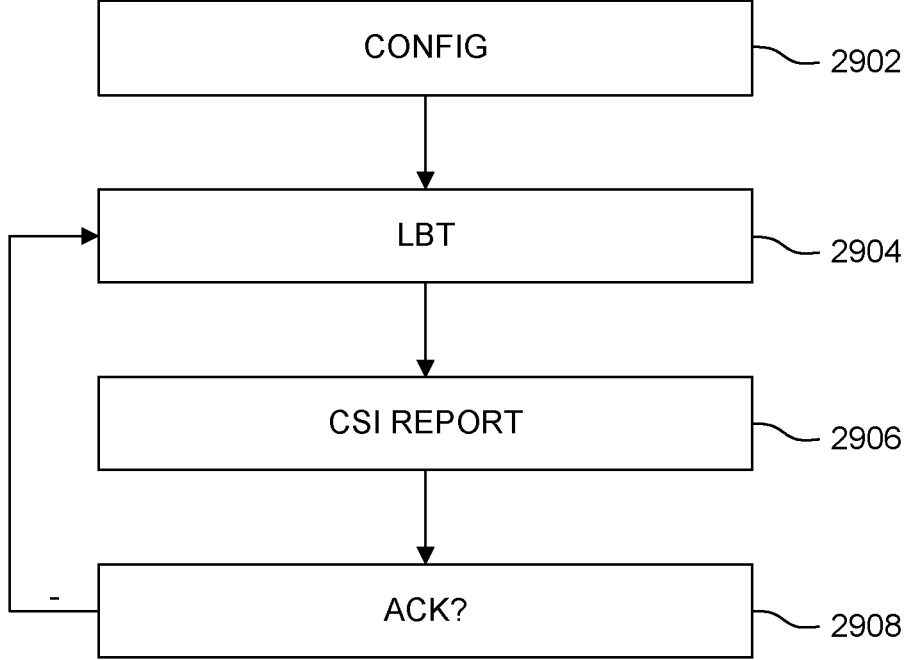
FIG. 29 is a flowchart illustrating an embodiment of a method for CSI reporting.

An eighth example of the present disclosure relates, with reference to FIG. 29, to a Channel State Information (CSI)

reporting method performed by a wireless transmit/receive unit (WTRU). The method may comprise any of:

receiving 2902 a Radio Resource Control (RRC) configuration identifying a plurality of Channel State Information Reference Signal (CSI-RS) reporting parameters comprising a set of transmission resources to report CSI;

performing 2904 a Listen Before Talk (LBT) process using a first transmission resource;

transmitting 2906 a CSI report using the first transmission resource and/or waiting for an acknowledgement (ACK); and/or after a period of time, repeating 2908 the performing of the LBT process and the transmitting of the CSI report using another transmission resource of the set of transmission resources until an ACK is received.

The following features of the method for CSI reporting may be advantageously implemented alone or in various combinations:

the set of transmission resources may be associated with any of: different frequency bands; different BWPs; different numerologies; different Coresets; different RATS; or different cells;

the set of transmission resources may comprise grant-based transmission resources and/or grant-free transmission resources; and/or the transmission of the CSI report may occur on a Physical Uplink Control CHannel (PUCCH) or on a Physical Uplink Shared CHannel (PUSCH).

Although the features and elements of the present invention are described in the preferred embodiments in particular combinations, each feature or element can be used alone without the other features and elements of the preferred embodiments or in various combinations with or without other features and elements of the present invention. Although the embodiments described herein consider New Radio (NR), 5G or LTE, LTE-A specific protocols, it is understood that the embodiments described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods, operations, procedures and/or functions.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FP-GAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A listen before talk (LBT) method performed by a wireless transmit/receive unit (WTRU), the method comprising:
  performing a first LBT sensing on a first beam for a channel;
  performing a second LBT sensing on a second beam for the channel;
  determining that the channel is idle based on the first LBT sensing and the second LBT sensing;
  transmitting a first transmission on the channel using the first beam to a network;
  based on the channel being idle for the second beam determined based on the second LBT sensing, and prior to transmitting on the second beam, performing a third LBT sensing on the second beam for the channel; and
  on condition that the channel is idle for the second beam based on the third LBT sensing, transmitting a second transmission on the channel using the second beam to the network.

2. The method of claim 1, further comprising receiving beam scheduling information prior to performing the first LBT sensing.

3. The method of claim 2, further comprising switching from the first beam to the second beam for transmission based on the beam scheduling information.

4. The method of claim 1, wherein the first LBT sensing and the second LBT sensing are directional sensing procedures performed simultaneously.

5. The method of claim 1, wherein performing the first LBT sensing and the second LBT sensing include using a contention window with a random backoff, and wherein the random backoff determines a duration of time during which the channel is sensed to be idle before the WTRU transmits on the channel using the first beam.

6. The method of claim 1, wherein performing the third LBT sensing includes using a fixed time duration during which the channel is sensed to be idle before the WTRU transmits on the channel using the second beam.

7. The method of claim 1, wherein transmitting the first transmission on the channel using the first beam comprises transmitting on the channel within a channel occupancy time (COT) using the first beam.

8. The method of claim 7, wherein transmitting the second transmission on the channel using the second beam comprises transmitting on the channel within the COT using the second beam.

9. The method of claim 1, wherein the second LBT sensing is a first type of LBT sensing, and the third LBT sensing is a second type of LBT sensing, and wherein the first type of LBT sensing is different than the second type of LBT sensing.

10. The method of claim 1, wherein the method further comprises:
  performing the third LBT sensing on the second beam for the channel after the first transmission; and
  transmitting the second transmission on the channel using the second beam on condition that the channel is idle based on both the second LBT sensing and the third LBT sensing.

11. A wireless transmit/receive unit (WTRU) having circuitry to perform a listen before talk (LBT) multibeam method, the circuitry configured to:
  perform a first LBT sensing on a first beam for a channel;
  perform a second LBT sensing on a second beam for the channel;
  determine that the channel is idle based on the first LBT sensing and the second LBT sensing;
  transmit a first transmission on the channel using the first beam to a network;
  based on the channel being idle for the second beam determined based on the second LBT sensing, and prior to transmitting on the second beam, perform a third LBT sensing on the second beam for the channel; and
  on condition that the channel is idle for the second beam based on the third LBT sensing, transmit a second transmission on the channel using the second beam to the network.

12. The WTRU of claim 11, wherein the WTRU transmits a beam schedule to a receiver prior to performing the first LBT sensing.

13. The WTRU of claim 11, wherein the first LBT sensing and the second LBT sensing are directional sensing procedures performed simultaneously.

14. The WTRU of claim 11, wherein the first LBT sensing and the second LBT sensing includes use of a contention window with a random backoff, and wherein the random backoff determines a duration of time during which the channel is sensed to be idle before the WTRU transmits on the channel using the first beam.

15. The WTRU of claim 11, wherein the third LBT sensing includes use of a fixed time duration during which the channel is sensed to be idle before the WTRU transmits on the channel using the second beam.

16. The WTRU of claim 11, wherein the WTRU transmits the first transmission on the channel using the first beam within a channel occupancy time (COT).

17. The WTRU of claim 16, wherein the WTRU transmits the second transmission on the channel using the second beam within the COT.

18. The WTRU of claim 11, wherein the second LBT sensing is a first type of LBT sensing, and the third LBT sensing is a second type of LBT sensing, and wherein the first type of LBT sensing is different than the second type of LBT sensing.

19. The WTRU of claim 11, wherein the processor is configured to:

perform a third LBT sensing on the second beam for the channel after the first transmission; and transmit the second transmission on the channel using the second beam on condition that the channel is idle based on both the second LBT sensing and the third LBT sensing.

20. A wireless transmit/receive unit (WTRU) having circuitry to perform a listen before talk (LBT) multibeam method, the circuitry configured to:

perform a first LBT sensing on a first beam for a channel;

perform a second LBT sensing on a second beam for the channel;

determine that the channel is idle based on the first LBT sensing and the second LBT sensing;

transmit a first transmission on the channel using the first beam to a network;

perform a third LBT sensing on the second beam for the channel after the first transmission;

based on the condition that the channel is idle for the second beam based on both the second LBT sensing and the third LBT sensing, transmit a second transmission on the channel using the second beam to the network.

* * * * *